US012143806B2

(12) United States Patent
McElveen et al.

(10) Patent No.: US 12,143,806 B2
(45) Date of Patent: Nov. 12, 2024

(54) SPATIAL AUDIO ARRAY PROCESSING SYSTEM AND METHOD

(71) Applicant: Wave Sciences, LLC, Charleston, SC (US)

(72) Inventors: James Keith McElveen, Charleston, SC (US); Gregory S. Nordlund, Jr., Charleston, SC (US); Leonid Krasny, Cary, NC (US)

(73) Assignee: Wave Sciences, LLC, Charleston, SC (US)

( * ) Notice: Subject to any disclaimer, the term of this patent is extended or adjusted under 35 U.S.C. 154(b) by 435 days.

(21) Appl. No.: 17/690,748

(22) Filed: Mar. 9, 2022

(65) Prior Publication Data

US 2022/0201421 A1 Jun. 23, 2022

Related U.S. Application Data

(63) Continuation-in-part of application No. 17/539,082, filed on Nov. 30, 2021, now Pat. No. 11,997,474, (Continued)

(51) Int. Cl.
*H04S 7/00* (2006.01)
*H04R 1/40* (2006.01)

(52) U.S. Cl.
CPC ............ *H04S 7/307* (2013.01); *H04R 1/406* (2013.01)

(58) Field of Classification Search
CPC ......... H04S 7/307; H04S 7/305; H04R 3/005; H04R 1/406; H04R 5/02; H04R 2430/25; (Continued)

(56) References Cited

U.S. PATENT DOCUMENTS 9,197,974 B1 11/2015 Clark et al.
2002/0126856 A1 9/2002 Krasny et al.
(Continued)

OTHER PUBLICATIONS

Extended European Search Report, European application No. 20864437.7. Date of mailing: Jan. 2, 2024. European Patent Office, Munich, DE.

(Continued)

*Primary Examiner* — Yogeshkumar Patel
(74) *Attorney, Agent, or Firm* — Gregory Finch; Finch Paolino, LLC

(57) ABSTRACT

A spatial audio processing system operable to enable audio signals to be spatially extracted from, or transmitted to, discrete locations within an acoustic space. Embodiments of the present disclosure enable an array of transducers being installed in an acoustic space to combine their signals via inverting physical and environmental models that are measured, learned, tracked, calculated, or estimated. The models may be combined with a whitening filter to establish a cooperative or non-cooperative information-bearing channel between the array and one or more discrete, targeted physical locations in the acoustic space by applying the inverted models with whitening filter to the received or transmitted acoustical signals. The spatial audio processing system may utilize a model of the combination of direct and indirect reflections in the acoustic space to receive or transmit acoustic information, regardless of ambient noise levels, reverberation, and positioning of physical interferers.

20 Claims, 18 Drawing Sheets

Related U.S. Application Data which is a continuation-in-part of application No. 16/985,133, filed on Aug. 4, 2020, now Pat. No. 11,190,900, which is a continuation of application No. 16/879,470, filed on May 20, 2020, now Pat. No. 10,735,887.

(60) Provisional application No. 62/902,564, filed on Sep. 19, 2019.

(58) Field of Classification Search
CPC ........... G06N 3/02; G10L 25/30; G10L 15/20; G10L 15/22; G10L 21/0232; G10L 21/038
See application file for complete search history.

(56) References Cited

U.S. PATENT DOCUMENTS

| | | | | |
|---|---|---|---|---|
| 2016/0071526 | A1 | 3/2016 | Wingate et al. | |
| 2017/0092256 | A1 | 3/2017 | Ebenezer | |
| 2017/0287499 | A1* | 10/2017 | Duong | G10L 21/0208 |
| 2018/0146319 | A1 | 5/2018 | Benattar | |
| 2019/0088269 | A1* | 3/2019 | Markovich Golan | G10L 21/0364 |
| 2019/0172450 | A1* | 6/2019 | Mustiere | G10L 21/0232 |

OTHER PUBLICATIONS

Dai, Junyu et al., "A System Integrating Speech Interaction and Vision Sensing Applying in Smart Home Scenario." 2019 IEEE International Symposium on Circuits and Systems. May 26, 2019. IEEE, New York, NY.

* cited by examiner

SPATIAL AUDIO ARRAY PROCESSING SYSTEM AND METHOD

CROSS-REFERENCE TO RELATED APPLICATIONS

This application is a continuation-in-part of U.S. patent application Ser. No. 17/539,082, filed on Nov. 30, 2021 entitled "SPATIAL AUDIO ARRAY PROCESSING SYSTEM AND METHOD," which is a continuation-in-part of U.S. patent application Ser. No. 16/985,133, filed on Aug. 4, 2020 entitled "SPATIAL AUDIO ARRAY PROCESSING SYSTEM AND METHOD," which is a continuation of U.S. patent application Ser. No. 16/879,470, filed on May 20, 2020 entitled "SPATIAL AUDIO ARRAY PROCESSING SYSTEM AND METHOD," which claims the benefit of U.S. Provisional Application Ser. No. 62/902,564, filed on Sep. 19, 2019 entitled "SPATIAL AUDIO ARRAY PROCESSING SYSTEM AND METHOD"; the disclosures of said applications being hereby incorporated in the present application in their entireties at least by virtue of this reference.

FIELD

The present disclosure relates to the field of audio processing; in particular, a spatial audio array processing system and method operable to enable audio signals to be received from, or transmitted to, selected locations in an acoustic space.

BACKGROUND

A wide variety of acoustic transducers, such as microphones, are commonly used to acquire sounds from a target audio source, such as speech from a human speaker. The quality of the sound acquired by microphones is adversely affected by a variety of factors, such as attenuation over the distance between the target audio source to the microphone (s), interference from other acoustic sources particularly in high noise environments, and sound wave reverberation and echo.

One way to mitigate these effects is to use a directional audio system, such as a shotgun microphone, a parabolic dish microphone, or a microphone array beamformer. All three approaches create constructive and destructive interference patterns between sounds arriving at them to create directional audio pickup patterns that discriminate based upon those angles of arrival. Beamforming broadly describes a class of array processing techniques that are operable to create/form a pickup pattern through a combination of multiple microphones to form an interference pattern (i.e., a "beam"). Beamforming techniques may be broadly classified as either data-independent (i.e., where the directional pickup pattern is fixed until re-steered) or data-dependent (i.e., where the directional pickup pattern automatically adapts its shape depending on which angle target and non-target sounds arrive). Prior art microphone array beamforming systems include, broadly, a plurality of microphone transducers that are arranged in a spatial configuration relative to each other. Some embodiments allow electronic steering of the directional audio pickup pattern through the application of electronic time delays to the signals produced by each microphone transducer to create the steerable directional audio pickup pattern. Combining the signals may be accomplished by various means, including acoustic waveguides (e.g., U.S. Pat. No. 8,831,262 to McElveen), analog electronics (e.g., U.S. Pat. No. 9,723,403 to McElveen), and digital electronics (e.g., U.S. Pat. No. 9,232,310 to Huttunen et al.). The digital systems include a microphone array interface for converting the microphone transducer output signals into a different form suitable for processing by a digital computing device. The digital systems also include a computing device such as a digital processor or computer that receives and processes the converted microphone transducer output signals and a computer program that includes computer readable instructions, which when executed processes the signals. The computer, the computer readable instructions when executed, and the microphone array interface form structural and functional modules for the microphone array beamforming system.

Apart from sound acquisition enhancement from selected sound source directions in an acoustic space, a further advantage of microphone array systems in general is the ability to locate and track prominent sound sources in the acoustic space. Two common techniques of sound source location are known as the time difference of arrival (TDOA) method and the steered response power (SRP) method, which can be used either alone or in combination.

As mentioned above, microphone array beamforming techniques are commonly used to reduce the amount of reverberation captured by the transducers. Excessive reverberation negatively affects the intelligibility and quality of captured audio as perceived by human listeners, as well as the performance of automatic speech recognition and speech biometric systems. Reverberation is reduced by microphone array beamformers by reducing the contribution of sounds received from directions other than the target direction (i.e., where the "beam" is directed).

In scenarios having multiple sound sources, such as when a group of speakers are engaged in conversation (e.g., around a table) the sound source location or active speaker position in relation to the microphone array changes. In addition, more than one speaker may speak at a given time, producing a significant amount of simultaneous speech from different speakers in different directions relative to the array. Furthermore, more than one sound source may be located in the same general direction relative to the array and therefore cannot be discriminated solely using direction of arrival techniques, such as microphone array beamforming. In such a complex environment, the effective acquisition of target sound sources requires simultaneous beamforming in multiple directions in the reception space around the microphone array to execute the aforementioned data-adaptive technique. This requires fast and accurate processing techniques to enable the sound source location and robust beamforming techniques to mitigate the deleterious effects listed above. Even with an ideal implementation, if sound sources lie in the same direction relative to the array, these techniques will not suffice to discriminate between the sources, and real-world implementations still fall far short of the ideal.

Equally spaced array configurations (where the inter-element distances between the transducers are approximately equal) are known to have inherent limitations arising from the geometrical symmetry of their transducer arrangements, including increased pickup of sounds from untargeted directions through side lobes in their pickup patterns. These issues may be alleviated by using microphone arrays having asymmetric geometries. For example, U.S. Pat. No. 9,143,879 to McElveen provides for a directional microphone array having an asymmetric transducer geometry based on a mathematical sequence configured to enable scaling the array while maintaining asymmetric geometry.

Prior art solutions have attempted to provide for distributed or non-equally spaced microphone arrays to improve sound acquisition from multiple sound sources falling outside an array plane. For example, U.S. Pat. No. 8,923,529 to McCowan provides for an array of microphone transducers that are arranged relative to each other in N-fold rotational symmetry and a beamformer that includes beamformer weights associated with one of a plurality of spatial reception sectors corresponding to the N-fold rotational symmetry of the microphone array. However, such solutions require additional prior knowledge and control of the array, such as the spatial locations of the array elements, and do not effectively accommodate real-world acoustic conditions, such as large reflective surfaces in the acoustic space.

The design of beamforming arrays needs to take into account multiple factors, such as the range of audio frequencies that need to be beamformed; the amount of ambient, reverberant noise that is anticipated; the distance to the nearest and furthest target source; the need for fixed, user-selected, or automatic steering; the angles that sounds may arrive at the array from in the horizontal and vertical directions; and the spatial resolution of the pickup pattern (i.e., how wide the main lobe of the pickup pattern is). As a consequence, beamforming arrays that are designed to operate in loud, cluttered, or dynamic environments from a distance more than approximately an arm's length away, tend to include tens or even hundreds of transducers.

The pickup patterns of real-world microphone beamformer arrays are known to be significantly different from estimations used in their design due to variations between microphones. Consequently, microphone arrays require calibration, which involves additional time, complication, and expense.

Another way that has been explored to mitigate the effects of simultaneous noises, including co-speech, is through the use of what are known as blind source separation (BSS) algorithms. Several BSS approaches have been attempted over the last several decades, including principal component analysis, independent component analysis (ICA), spatio-temporal analysis, and sparse component analysis. At the current time, most real-world embodiments implement some variation of ICA. BSS algorithms are grouped according to whether they are over-determined (i.e., requiring more microphones than the number of real and virtual (reflected) interferers) or under-determined (i.e., have fewer microphones than the number of real and virtual interferers). In a highly reverberant acoustical environment, a few "real" sources can be quickly reflected into what appears to human hearing and mathematical algorithms as being a large number of sound sources because each reflection of a real source becomes, in effect, a "virtual" source and, thus, an additional interferer. In a mathematical sense, the problem referred to above that beamformers have in reverberation is related to that faced by blind source separation approaches a multitude of interferers requires a large number of microphones to overcome. In mathematics, this problem is also found in solving simultaneous equations for every unknown variable one is trying to solve for, one needs an independent equation with that variable, or in terms of solving cocktail party problems, for every real or virtual acoustic source, one needs an independent (i.e., spatially separated in a physical sense and without other dependency, such as cross-talk, between the microphones) acoustic recording of it. The real-world effect of this underlying mathematical problem is that blind source separation algorithms require a relatively large number of microphones to perform well in crowded, reverberant environments and may suffer from a significant amount of processing delay (also known as lag) in trying to unmix the various sound sources. In under-determined cases, BSS either does not work at all or results in very high levels of noise and distortion.

Another way that has been explored to mitigate the effects of simultaneous noises, including co-speech, is through the use of what is known as computational auditory scene analysis (CASA), which attempts to replicate or mimic the abilities of the human auditory system to separate (unmix) sound sources using computing devices. CASA algorithms by popular agreement constrain themselves to only one or two microphones, based on the corresponding limitations in humans, and therefore focus on the mathematically under-determined case. CASA algorithms are known to perform well only in situations where the target talker signal level is high relative to the background noise signal level, including co-speech and reverberation (i.e., high SNR situations).

Through applied effort, ingenuity, and innovation, Applicant has developed a solution that addresses a number of the deficiencies and problems with prior microphone array systems, associated microphone array processing methods, prior blind source separation methods, and prior methods that mimic the human auditory system. Applicant's solution is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An object of the present disclosure is to provide for a spatial audio processing system configured to spatially process an acoustic audio input using a different paradigm and approach than conventional microphone array beamforming, blind source separation, and computational auditory scene analysis approaches. In accordance with certain embodiments, a sound originating from an acoustic point source is estimated based upon an inverse solution to the Acoustic Wave Equation for a three-dimensional waveguide acoustic space with initial and boundary conditions applied to signals captured by an ad hoc, uncalibrated array of acoustic transducers with unknown and arbitrary, including a compact or a widely distributed, physical arrangement.

An object of the present disclosure is to provide for a spatial audio processing system comprising an environmental and physical model of an acoustic space as a waveguide and an adaptive whitening filter that are then used to process the audio input. In accordance with certain embodiments, both direct and indirect propagation paths between a target source and a transducer array, as well as modes and other aspects of the space, are incorporated into the model.

An object of the present disclosure is to provide for a spatial audio processing system that enables model parameters to be estimated, stored, retrieved, and used at a later time in an acoustic environment where the gross reflective parameters of the space and the locations of the array and target source(s) have not changed significantly. In addition, the model parameters can be adapted as they change. Furthermore, this disclosure enables the detection and location of new sources that enter the acoustic space. This is accomplished by correlating the signals received by the array with the Green's Functions already modeled for each hypothetical sound source location in the space.

An object of the present disclosure is to provide for a spatial audio processing system that provides for significant separation of target sources even when there are fewer microphones than real and virtual (i.e., reflected images of) noise sources (i.e., the under-determined mathematically case). In accordance with certain embodiments, the spatial audio processing system provides enhancement to target sounds emanating from a point source and reduction of non-desired sounds emanating from elsewhere than the targeted point source location, rather than filtering an audio input solely based on a sound wave's direction of arrival (i.e., along or within a "beam" as a conventional beamformer does). In accordance with certain embodiments, the system may provide for 15 dB (decibels) or more of additional signal-to-noise ratio (SNR) improvement compared to prior art beamforming techniques, while using far fewer transducers.

An object of the present disclosure is to provide for a spatial audio processing system that does not require knowledge of the array configuration, location, or orientation for improving SNR, regardless of whether the array transducers are co-located or distributed around an acoustic space (unless the particular application specifically requires visualizing or otherwise reporting the relative or absolute location of sound sources).

Specific embodiments of the present disclosure provide for a spatial audio processing system that employs short "glimpses" of sound that originate from a target source location to derive propagation characteristics of sounds from that location, and from the sounds captured by the transducer array extracts the sound that emanated from the target source location by discriminating all audio inputs according to the propagation characteristics of the target source location, with the overall effect of significantly reducing any and all sounds that emanated from a location other than the glimpsed one. The embodiment allows a plurality of locations in the same acoustic space to be so modeled simultaneously or sequentially using this system and method. According to certain embodiments, any arbitrary sound can be used for training in the same band of audio frequencies, even if the sound is not used in its entirety, such as when interferers are too loud relative to the target sound for modeling. The glimpse can instead be assembled from sounds sampled at various points in a time stream as long as the physical locations of the array and point source have not changed significantly. In accordance with certain preferred embodiments, the system utilizes an accumulation of approximately two seconds of accumulated glimpsing of sound from a target source location, though more glimpses of sound can be used to improve performance in many situations. In accordance with certain embodiments, model parameters (including the Green's Function parameters) can be filtered to weight stronger components over weaker ones to improve measurements that contain sounds from other (non-desired) locations.

Further objects of the present disclosure provide for a spatial audio processing system to overcome deficiencies associated with prior art single channel noise reduction techniques that are ineffective against noises that have similar time-frequency distributions as the target source.

Further objects of the present disclosure provide for a spatial audio processing system to overcome deficiencies associated with prior art multi-channel noise reduction techniques that require noise references constrained to a limited number of situations.

Further objects of the present disclosure provide for a spatial audio processing system to overcome deficiencies associated with prior art multi-channel techniques, such as beamforming and blind source separation, that require a large number of microphones and additional prior knowledge such as spatial locations of each element in the array of transducers, noise statistics of the current acoustic space, transducer array calibration, target source location(s), and noise source location(s).

Further objects of the present disclosure provide for a spatial audio processing system to overcome deficiencies associated with prior art computational auditory scene analysis techniques that require relatively higher SNR levels or other knowledge, such as when the target talker is speaking.

Further objects of the present disclosure provide for a spatial audio processing system that provides for a physical geometric propagation model that is simple and straightforward to calculate, has sufficient accuracy to prefer sounds originating from a relatively small volume of realistic acoustic space, increases the signal-to-noise ratio (SNR) by approximately 15 dB beyond existing beamforming and noise reduction systems, and is robust to transducer noise, ambient noise, reverberation, distance, level, orientation, model estimation error, and other real-world variations.

Further objects of the present disclosure provide for a spatial audio processing system to overcome deficiencies associated with prior art multi-channel techniques, such as beamforming and signal separation, that fail to accommodate real-world acoustic conditions, such as large reflective surfaces, inanimate and animate objects situated or moving in-between the target acoustic location and the transducers, and other factors that interfere with the ideal, free-space propagation of acoustics.

Certain aspects of the present disclosure provide for a method for spatial audio processing comprising receiving, with an audio processor, an audio input comprising audio signals captured by a plurality of transducers within an acoustic environment; converting, with the audio processor, the audio input from a time domain to a frequency domain according to at least one transform function; determining, with the audio processor, at least one acoustic propagation model for at least one source location within the acoustic environment according to a normalized cross power spectral density calculation, the at least one acoustic propagation model comprising at least one Green's Function estimation; processing, with the audio processor, the audio input according to the at least one acoustic propagation model to spatially filter at least one target audio signal from one or more non-target audio signals, wherein the target audio signal corresponds to the at least one source location; and applying, with the audio processor, a whitening filter to a spatially filtered target audio signal to derive at least one separated audio output signal, wherein the whitening filter is applied concurrently or concomitantly with the at least one acoustic propagation model.

In accordance with certain embodiments of the method for spatial audio processing, the at least one transform function is selected from the group consisting of Fourier transform, Fast Fourier transform, Short Time Fourier transform and modulated complex lapped transform. The method may further comprise performing, with the audio processor, at least one inverse transform function to convert the at least one separated audio output signal from a frequency domain to a time domain. The method may further comprise rendering or outputting, with the audio processor, a digital audio file comprising the at least one separated audio output signal.

In accordance with certain embodiments, the method for spatial audio processing may further comprise determining, with the audio processor, two or more acoustic propagation models associated with two or more source locations within the acoustic environment and storing each acoustic propagation model in the two or more acoustic propagation models in a computer-readable memory device. The method may further comprise creating, with the audio processor, a separate whitening filter for each acoustic propagation model in the two or more acoustic propagation models. In some embodiments, the method may further comprise applying, with the audio processor, a spectral subtraction noise reduction filter to the at least one separated audio output signal. The method may further comprise applying, with the audio processor, a phase correction filter to the spatially filtered target audio signal. In some embodiments, the method may further comprise receiving, in real-time, at least one sensor input comprising sound source localization data for at least one sound source. In some embodiments, the method may further comprise determining, in real-time, the at least one source location according to the sound source localization data. In some embodiments, the at least one sensor input comprises a camera or a motion sensor.

Further aspects of the present disclosure provide for a spatial audio processing system, comprising a plurality of acoustic transducers being located within an acoustic environment and operably engaged to comprise an array, the plurality of transducers being configured to capture acoustic audio signals from sound sources within the acoustic environment; a computing device comprising an audio processing module communicably engaged with the plurality of acoustic transducers to receive an audio input comprising the acoustic audio signals, the audio processing module comprising at least one processor and a non-transitory computer readable medium having instructions stored thereon that, when executed, cause the processor to perform one or more spatial audio processing operations, the one or more spatial audio processing operations comprising converting the audio input from a time domain to a frequency domain according to at least one transform function; determining at least one acoustic propagation model for at least one source location within the acoustic environment according to a normalized cross power spectral density calculation, the at least one acoustic propagation model comprising at least one Green's Function estimation; processing the audio input according to the at least one acoustic propagation model to spatially filter at least one target audio signal from one or more non-target audio signals, wherein the target audio signal corresponds to the at least one source location; and applying, with the audio processor, a whitening filter to a spatially filtered target audio signal to derive at least one separated audio output signal.

In accordance with certain aspects of the present disclosure, the at least one transform function is selected from the group consisting of Fourier transform, Fast Fourier transform, Short Time Fourier transform and modulated complex lapped transform. In certain embodiments, the one or more spatial audio processing operations may further comprise applying a spectral subtraction noise reduction filter to the at least one separated audio output signal. The one or more spatial audio processing operations may further comprise applying a phase correction filter to the spatially filtered target audio signal. In some embodiments, the one or more spatial audio processing operations may further comprise applying at least one inverse transform function to convert the at least one separated audio output signal from a frequency domain to a time domain.

In accordance with certain aspects of the present disclosure, the spatial audio processing system may further comprise at least one sensor communicably engaged with the computing device to provide, in real-time, one or more sensor inputs comprising sound source localization data for at least one sound source. The computing device may be configured to process the one or more sensor inputs in real-time to determine the at least one source location and communicate the at least one source location to the audio processing module. In some embodiments, the at least one sensor may comprise a camera, a motion sensor and/or another type of image sensor.

Still further aspects of the present disclosure provide for a non-transitory computer-readable medium encoded with instructions for commanding one or more processors to execute operations for spatial audio processing, the operations comprising receiving an audio input comprising audio signals captured by a plurality of transducers within an acoustic environment; converting the audio input from a time domain to a frequency domain according to at least one transform function; determining at least one acoustic propagation model for at least one source location within the acoustic environment according to a normalized cross power spectral density calculation, the at least one acoustic propagation model comprising at least one Green's Function estimation; processing the audio input according to the at least one acoustic propagation model to spatially filter at least one target audio signal from one or more non-target audio signals, wherein the target audio signal corresponds to the at least one source location; and applying a whitening filter to a spatially filtered target audio signal to derive at least one separated audio output signal.

Further aspects of the present disclosure provide for a method for spatial audio processing comprising receiving, with an audio processor, an audio input comprising audio signals captured by a plurality of transducers within an acoustic environment; converting, with the audio processor, the audio input from a time domain to a frequency domain according to at least one transform function; calculating, with the audio processor, a normalized cross power spectral density for the audio input according to a machine learning framework, wherein the machine learning framework comprises a one or more of a deep neural network, a cascade-correlation neural network or a convolutional recurrent neural network, determining, with the audio processor, at least one acoustic propagation model for at least one source location within the acoustic environment according to the machine learning framework and the normalized cross power spectral density; processing, with the audio processor, the audio input according to the at least one acoustic propagation model to spatially filter at least one target audio signal from one or more non-target audio signals, wherein the target audio signal corresponds to the at least one source location; and applying, with the audio processor, a whitening filter to a spatially filtered target audio signal to derive at least one separated audio output signal, wherein the whitening filter is applied concurrently or concomitantly with the at least one acoustic propagation model.

In accordance with certain aspects of the present disclosure, the method for spatial audio processing may further comprise calculating, with the audio processor, a mask for one or more non-target audio signals in the audio input according to the machine learning framework. In certain embodiments, processing the audio input may further comprise estimating a spatial correlation matrix according to the machine learning framework. In certain embodiments, the method for spatial audio processing may further comprise generating the whitening filter according to the machine learning framework, wherein the machine learning framework comprises a convolutional neural network. In certain embodiments, the method for spatial audio processing may further comprise cleaning the audio input according to the machine learning framework, wherein the machine learning framework comprises a convolutional neural network. In certain embodiments, the audio input may comprise a training audio input. In certain embodiments, determining the at least one acoustic propagation model may further comprise estimating a Green's Function for the audio input according to the machine learning framework. In certain embodiments, the method for spatial audio processing may further comprise applying the estimated Green's Function to the audio input according to the machine learning framework to spatially filter the at least one target audio signal from the one or more non-target audio signals. In certain embodiments, the at least one transform function is selected from the group consisting of auditory filter bank, cochlear filter bank, non-linear filter bank, linear filter bank, Fourier transform, Fast Fourier transform, Short Time Fourier transform and modulated complex lapped transform. In certain embodiments, the method for spatial audio processing may further comprise performing, with the audio processor, at least one inverse transform function to convert the at least one separated audio output signal from a frequency domain to a time domain. In certain embodiments, the method for spatial audio processing may further comprise rendering or outputting, with the audio processor, a digital audio output comprising the at least one separated audio output signal.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

Figure 1:
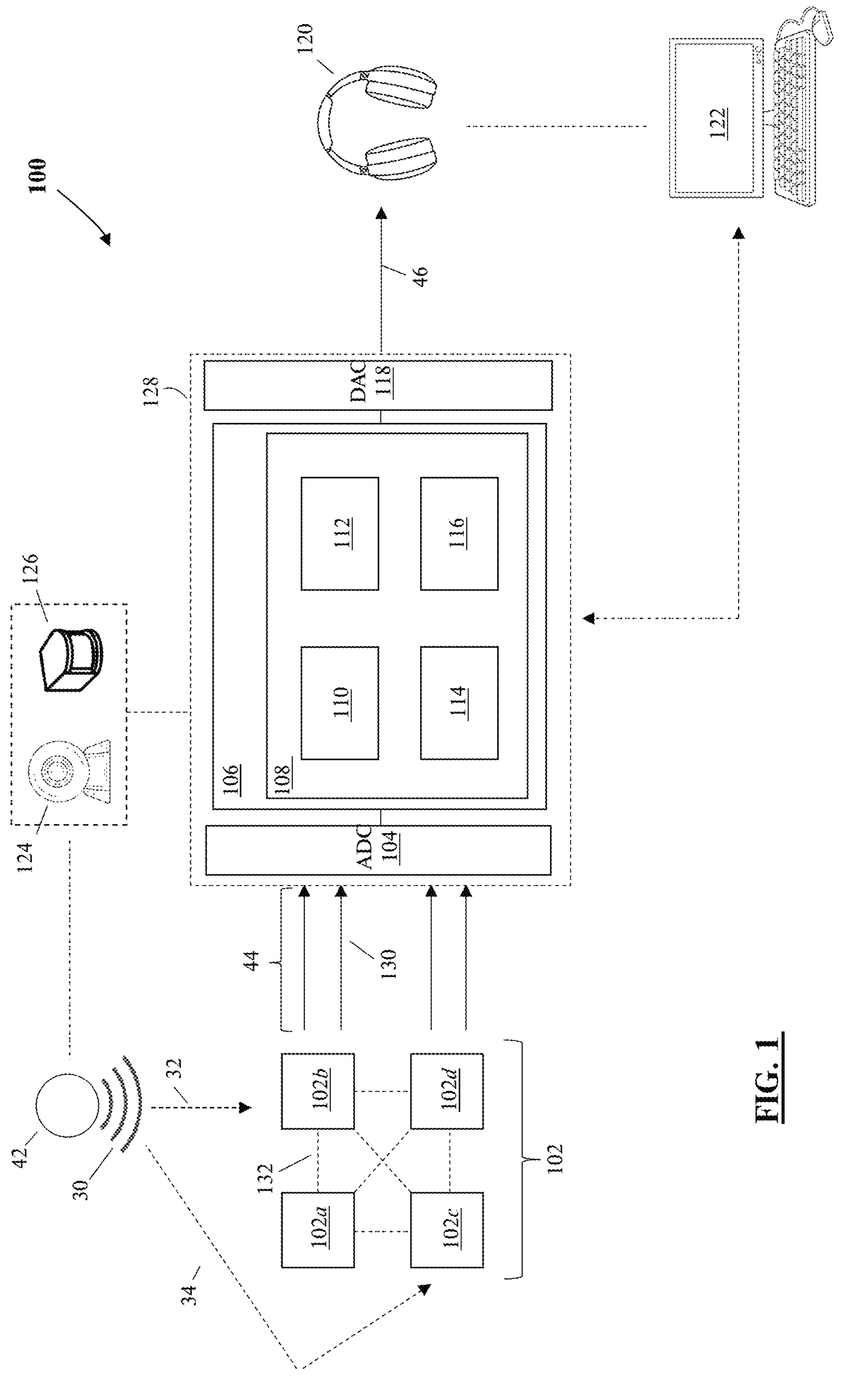
FIG. 1 is a system diagram of a spatial audio processing system, according to an embodiment of the present disclosure.

Before the present invention and specific exemplary embodiments of the invention are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Following below are more detailed descriptions of various concepts related to, and embodiments of, inventive methods, devices, systems and non-transitory computer-readable media having instructions stored thereon to enable one or more said systems, devices and methods for receiving an audio data input associated with an acoustic location; processing the audio data according to a linear framework configured to define one or more boundary conditions for the acoustic location to generate an acoustic propagation model; processing the audio data to determine at least one spatial or spectral characteristic of the audio data; identifying a three-dimensional spatial location corresponding to the at least one spatial or spectral characteristic, the three-dimensional spatial location defining a point source within the acoustic location; processing the audio data according to the acoustic propagation model to extract a subject audio signal associated with the point source; processing the audio data to suppress audio signals that are not associated with the point source; and rendering a digital audio output comprising the subject audio signal.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a," "an," and "the" include plural referents unless the context clearly dictates otherwise. Thus, for example, reference to "a transducer" includes a plurality of such transducers and reference to "the signal" includes reference to one or more signals and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein the term "sound" refers to its common meaning in physics of being an acoustic wave. It therefore also includes frequencies and wavelengths outside of human hearing.

As used herein the term "signal" refers to any representation of sound whether received or transmitted, acoustic or digital, including target speech or other sound source.

As used herein the term "noise" refers to anything that interferes with the intelligibility of a signal, including but not limited to background noise, competing speech, non-speech acoustic events, resonance reverberation (of both target speech and other sounds), and/or echo.

As used herein the term Signal-to-Noise Ratio (SNR) refers to the mathematical ratio used to compare the level of target signal (e.g., target speech) to noise (e.g., background noise). It is commonly expressed in logarithmic units of decibels.

As used herein the term "microphone" may refer to any type of input transducer.

As used herein the term "array" may refer to any two or more transducers that are operably engaged to receive an input or produce an output.

As used herein the term "audio processor" may refer to any apparatus or system configured to electronically manipulate one or more audio signals. An audio processor may be configured as hardware-only, software-only, or a combination of hardware and software.

As used herein, the term "Artificial Intelligence" (AI) system refers to software (and optionally hardware) systems designed that, given a complex goal, act in the physical or digital dimension by perceiving their environment through data acquisition, interpreting the collected structured or unstructured data, reasoning on the knowledge, or processing the information, derived from this data and deciding the best action(s) to take to achieve the given goal. AI systems can either use symbolic rules or learn a numeric model, and they can also adapt their behavior by analyzing how the environment is affected by their previous actions. AI includes any algorithms, methods, or technologies that make a system act and/or behave like a human and includes machine learning, computer vision, natural language processing, cognitive, robotics, and related topics.

As used herein, the term "Machine Learning" (ML) refers to the application of AI techniques or algorithms using statistical methods that enable computing systems or machines to improve correlations as more data is used in a model, and for models to change over time as new data is correlated. Machine learning algorithms include, but are not limited to, Neural Networks, Artificial Neural Networks, Deep Learning or Deep Neural Networks, convolutional neural networks, cascade-correlation neural networks, convolutional recurrent neural networks, Deterministic models, stochastic models, supervised learning, unsupervised learning, Bayesian Networks, Clustering, Decision Tree Learning, Reinforcement Learning, Representation Learning and the like.

In accordance with various aspects of the present disclosure, recorded audio from an array of transducers (including microphones and other electronic devices) may be utilized instead of live input.

In accordance with various aspects of the present disclosure, waveguides may be used in conjunction with acoustic transducers to receive sound from or transmit sound into an acoustic space. Arrays of waveguide channels may be coupled to a microphone or other transducer to provide additional spatial directional filtering through beamforming. A transducer may also be employed without the benefit of waveguide array beamforming, although some directional benefit may still be obtained through "acoustic shadowing" that is caused by sound propagation being hindered along some directions by the physical structure that the waveguide is within. Two or more transducers may be employed in a spatially distributed arrangement at different locations in an acoustic space to define a spatially distributed array. Signals captured at each of the two or more spatially distributed transducers may comprise a live and/or recorded audio input for use in processing.

In accordance with various aspects of the present disclosure, the spatial audio array processing system may be implemented in a receive-only, transmit-only, or bi-directional embodiments as the acoustic Green's Function models employed are bi-directional in nature.

Certain aspects of the present disclosure provide for a spatial audio processing system and method that does not require knowledge of an array configuration or orientation to improve SNR in a processed audio output. Certain objects and advantages of the present disclosure may include a significantly greater (15 dB or more) SNR improvement relative to beamforming and/or noise reduction speech enhancement approaches. In certain embodiments, an exemplary system and method according to the principles herein may utilize four or more input acoustic channels and one or more output acoustic channel to derive SNR improvements.

Certain objects and advantages include providing for a spatial audio processing system and method that is robust to changes in an acoustic environment and capable of providing undistorted human speech and other quasi-stationary signals. Certain objects and advantages include providing for a spatial audio processing system and method that requires limited audio learning data; for example, two seconds (cumulative).

In various embodiments, an exemplary system and method according to the principles herein may process audio input data to calculate/estimate, and/or use one or more machine learning techniques to learn, an acoustic propagation model between a target location of a sound source relative to one or more array elements within an acoustic space. In certain embodiments, the one or more array elements may be co-located and/or distributed transducer elements. Certain advantages of utilizing machine learning frameworks to estimate (i.e., learn) an acoustic propagation model for a target location of a sound source relative to one or more array elements within an acoustic space include reduced processing latency (particularly if processing is accomplished using analog, digital, or mixed neural network or optical components) and power consumption reduction.

Embodiments of the present disclosure are configured to accommodate for suboptimal acoustic propagation environments (e.g., large reflective surfaces, objects located between the target acoustic location and the transducers that interfere with the free-space propagation, and the like) by processing audio input data according to a data processing framework in which one or more boundary conditions are estimates within a Green's Function algorithm to derive an acoustic propagation model for a target acoustic location.

In various embodiments, an exemplary system and method according to the principles herein may utilize one or more audio modeling, processing, and/or rendering framework comprising a combination of a Green's Function algorithm and whitening filtering to derive an optimum solution to the Acoustic Wave Equation for the subject acoustic space. Certain advantages of the exemplary system and method may include enhancement of a target acoustic location within the subject acoustic space, with simultaneous reduction in all of the other subject acoustic locations. Certain embodiments enable projection of cancelled sound to a target location for noise control applications, as well as remote determination of residue to use in adaptively canceling sound in a target location.

In various embodiments, an exemplary system and method according to the principles herein is configured to construct an acoustic propagation model for a target acoustical location containing a point source within a linear acoustical system. In accordance with various aspects of the present disclosure, no significant practical constraints other than a point source within a linear acoustical system are imposed to construct the acoustic propagation model, such as (realizable) dimensionality (e.g., 3D acoustic space), transducer locations or distributions, spectral properties of the sources, and initial and boundary conditions (e.g., walls, ceilings, floor, ground, or building exteriors). Certain embodiments provide for improved SNR in a processed audio output even under "underdetermined" acoustic conditions, i.e., conditions having more noise sources than microphones.

An exemplary system and method according to the principles herein may comprise one or more passive, active, and/or hybrid operational modes (i.e., no energy can be added to the system under observation in order to be passive or energy can be added actively to provide additional information for processing and gain associated performance improvements).

In various embodiments, an exemplary system and method according to the principles herein are configured to enable acoustic tomography and mechanical resonance and natural frequency testing through use of acoustics.

Certain exemplary commercial applications and use cases in which certain aspects and embodiments of the present disclosure may be implemented include, but are not limited to, hearing aids, assistive listening devices, and cochlear implants; mobile computing devices, such as smartphones, personal computers, and tablet computers; mobile phones; smart speakers, voice interfaces, and speech recognition applications; audio forensics applications; music mixing and film editing; conferencing and meeting room audio systems; remote microphones; signal separation processing techniques; industrial equipment monitoring and diagnostics; medical acoustic tomography; acoustic cameras; sound reinforcement applications; and noise control applications.

The present disclosure refers to certain concepts related to audio processing, audio engineering, and the general physics of sound. To aid in understanding of certain aspects of the present disclosure, the following is a non-limiting overview of such concepts.

Sound Propagation

Sound emanates from an ideal point source with a spherical wavefront, which then expands geometrically as the distance from the source grows. In many real-world scenarios, sound sources may include non-spherical wavefronts; however, such wavefronts will still expand into and propagate through an acoustic space in a similar fashion until they encounter objects that will, as a consequence of the Law of Conservation of Energy, result in frequency dependent absorption, reflection, or refraction. Certain aspects of the present disclosure exploit the characteristic of a desired (also referred to as a target) location as containing a point source to help discriminate between target locations that should be modeled and undesired locations. At some distance, the wavefront, after sufficient expansion, can frequently be approximated by a plane over the physical aperture of an object that it encounters, whether a wall, floor, ceiling, or microphone array. Propagation between a source and another location (such as a transducer location) can be divided into two general categories: direct path and indirect path.

Direct path travels directly between a source and a target (e.g., mouth to microphone or loudspeaker to ear, which are also commonly referred to as the transmitter and receiver by engineers). Indirect paths travel via longer paths that include reflecting off larger surface(s), relative to the acoustic wavelength. Indirect paths are comprised of early arrival reflections and late arrival reflections (known as reverberation, or “directionless sound,” which is sound that has bounced around multiple surfaces such that it appears to come from everywhere). Sound propagation in a linear acoustical system exhibits symmetry (i.e., the receiver and transmitter can be reversed, so the system works in both directions).

Theoretical Analysis and Modeling

Certain illustrative examples of theoretical analysis and modeling in microphone array and audio processing may comprise Ray Tracing, the Acoustic Wave Equation, and the Green’s Function. Ray Tracing is a common way of mapping the acoustic propagation through a physical space. It treats the propagation of sound in a mechanical manner similar to a billiard ball that is struck and bounces off of various surfaces around a billiard table, or, in this case, an acoustic space. The “source” in Ray Tracing is where the sound energy originates and propagates from in the field of acoustics known as Geometrical Theory. An “image” is where a reflection of a sound would appear to have originated from the perspective of the receiver (e.g., microphone array) if no reflective boundaries were present. The Acoustic Wave Equation is a second-order partial-differential equation in physics that describes the linear propagation of acoustic waves (sound) in a mechanical medium of gas (e.g., air), fluid (e.g., water), or solids (e.g., walls or earth). The Green’s Function is a mathematical solution to the Acoustic Wave Equation used by physicists that can incorporate initial and boundary conditions. Existing solutions for estimating or measuring the Green’s Function directly involve the time domain. (For a background example of this approach, see “Recovering the Acoustic Green’s Function from Ambient Noise Cross Correlation in an Inhomogeneous Moving Medium,” Oleg A. Godin, CIRES, University of Colorado and NOAA/Earth System Research Laboratory, Physical Review Letters, August 2006, hereby incorporated by reference to this disclosure in its entirety.) Practical real-world applications involve initial and boundary conditions that are frequency dependent. A frequency-domain version of a Green’s Function is much more desirable than time-domain versions due to the longitudinal compressional nature of sound waves. As a consequence, to date, time-domain solutions have been problematic to estimate or measure with sufficient accuracy and precision for use in robust, uncontrolled, real-world conditions such as conference rooms, auditoriums, restaurants, and classrooms.

Human Hearing

The ability of human hearing to extract desired speech from the sound in a noisy room comprising a mixture of competing speech—such as occurs during a cocktail party—using only two normally-hearing ears, even in the presence of many more acoustic noise sources and reverberation, is commonly referred to as the “Cocktail Party Effect.” While not fully understood, this ability is believed to rely on the following mechanisms, in addition to others: Direction of Arrival, the Haas Effect, and Glimpsing. With respect to direction of arrival, human hearing uses the difference between the time of arrival of a sound at the left and right ears (called the interaural time difference) and/or the difference in loudness and frequency distribution between the two ears (called the interaural level difference) to determine the direction the sound arrives from. This also helps in discriminating between sounds originating from different locations.

The Haas Effect refers to the characteristic of human hearing that fuses sound arriving via direct and early arrival reflection paths that consequently improves speech intelligibility in reverberant environments. Sounds arriving later, such as via the late arrival reflection paths, are not fused and interfere with speech intelligibility.

Glimpsing refers to aspects of human hearing that employs brief auditory “glimpses” of desired (target) speech during lulls in the overall noise background, or more specifically in time-frequency regions where the target speech is least affected by the noise. Different segments of the frequency regions selected over the glimpse time frame may be combined to form a complete glimpse that is used for the cocktail party effect.

The Cocktail Party Problem is defined as the problem that human hearing experiences when there are noises that mask the target speech (or other desired acoustic signals), such as competing speech and speech-like sounds. If there is significant reverberation in addition to masking noises, then the effect of the problem is exacerbated. Loss of hearing in the 6-10 KHz range in one or both ears is known to lead to a loss of the acoustical cues used by the brain to determine direction of arrival and is believed to be a significant contributor to the Cocktail Party Problem.

Speech Enhancement

By speech enhancement we mean single channel noise reduction and multi-channel noise reduction techniques. Speech enhancement is used to improve quality and intelligibility of speech for both humans and machines (the latter by improving the efficacy of automatic speech recognition). Single channel noise reduction is effective when target (i.e., desired) speech and noise are different and the difference is known in a way that is easily measured or determined by a machine algorithm, for example, their frequency band (where many machine-made noises are low in frequency and sometimes narrowband) or temporal predictability (like resonance). In situations where the speech and the noise have similar temporal or spectral (frequency) characteristics, in the absence of other prior information that can be used to discriminate target speech from noise, single channel noise reduction techniques will not provide significant improvements in intelligibility. Multi-channel noise reduction may comprise additional channels of audio to increase the possibilities for noise reduction and, consequentially, improve speech recognition. If one or more of the additional channels can be used as references for noises and are not corrupted by speech (particularly the target speech), adaptive filters can sometimes be devised to reduce these noises, including not only the energy contained in their direct path to the microphone(s) but also their indirect path. This process is commonly referred to as reference cancellation.

Multiple channels of audio can be combined to create patterns of constructive and destructive interference across the frequency band of interest that will discriminate between sound waves arriving from different directions. This approach is commonly referred to as “beamforming” due to the shape of the constructive interference pattern of an array of transducer channels arranged in a 2D planar configuration. Conventional, or delay-sum, beamforming (also called “acoustic focus” beamforming) combines the channels, with or without amounts of time delay being applied to the channels before combining for steering the “beam,” in a direction with a bearing and/or elevation relative to a conceptual 2D plane, as drawn through the array configuration. In the case of speech enhancement, conventional beamformers increase the SNR of the target source by reducing sound energy that comes of directions other than the steered direction. They are effective at reducing the energy of reverberation but also reduce energy from the target source that arrives at the array via an indirect path (i.e., the "early reflections" that do not arrive in the beam). Conventional beamforming requires prior knowledge of the array configuration to accomplish the design of the interference pattern, the range of frequencies the interference pattern (beamforming) will be effective over, and any steering direction, including understanding the required steering delays to steer toward the target source. Individual channels may also have additional channel-combining or other filtering applied on a per-channel basis to modify the behavior of the beamformer, such as the shape of the pattern.

Adaptive beamforming combines the audio channels in a manner that adapts some of its design parameters, such as time delays and channel weights, based on the sounds it receives to accomplish a desired behavior, such as automatically and adaptively steering nulls in its pattern toward nearby noise sources. Adaptive beamforming also requires knowledge of the array configuration, array orientation, and the direction of the target source which is to be retained or enhanced. In addition, to provide improvement in general situations it also requires an algorithm that will respond according to the acoustic environment and any changes in that environment, such as noise level, reverberation level and decay time, and location of noise sources and their reflected images. In the case of listening (receiving), adaptive beamformers increase the SNR of the target source by reducing sound energy that arrives from directions other than the steered direction. As with conventional, or delay-sum, beamformers, adaptive beamformers are typically effective at reducing the energy of reverberation but also reduce energy from the target source that arrives at the array via an indirect path (i.e., the "early reflections" that are discriminated against in the spatial pattern). Like conventional beamformers, channels may have additional filtering applied on a per-channel basis to modify the behavior of the beamformer, such as the shape of the pattern. Also, like conventional beamformers, noise sources in the beam are mixed in with the target source. Noise sources that are in the beam and louder than the target source (due to being closer to the array or due to differences in amplitude) may partially or completely obscure or mask the target source, depending in part on their similarity to the target source in time and frequency characteristics. A rake receiver is a subtype of adaptive microphone array beamformers that applies additional time delays to the channels in an attempt to adaptively and continually re-shape its interference pattern to take advantage of early indirect path energy associated with the target source by detecting and then shaping the beamformer's interference patterns to steer not only an acoustic focus toward the target source but also create other lobes in the interference pattern to emphasize some of the steering directions to those indirect paths that the sound energy arrives from and combine the sound energy with estimated time delays so that the target source energy from the direct and steered indirect paths are combined constructively instead of destructively. The complexities of implementation and sensitivity to small errors result in rake receivers being conceptually elegant but lacking in robustness when applied to dynamic, adverse, real-world conditions.

Turning now descriptively to the drawings, in which similar reference characters denote similar elements throughout the several views, FIG. 1 is a system diagram of a spatial audio processing system 100 according to certain embodiments of the present disclosure. According to an embodiment, spatial audio processing system 100 generally comprises transducer array 102 and processing module 128; and may further optionally comprise audio output device 120, computing device 122, camera 124, and motion sensor 126. Transducer array 102 may comprise an array of transducers (e.g., microphones) being installed in an acoustic space (e.g., a conference room). In accordance with certain embodiments, transducer array 102 may comprise transducer 102*a*, transducer 102*b*, transducer 102*c*, and transducer 102*d*. Transducers 102*a-d* may comprise micro-electro-mechanical system (MEMS) microphones, electret microphones, contact microphones, accelerometers, hearing aid microphones, hearing aid receivers, loudspeakers, horns, vibrators, ultrasonic transmitters, and the like. Transducer array 102 may comprise as few as one transducer and up to an Nth number of transducers (e.g., 64, 128, etc.). Transducer 102*a*, transducer 102*b*, transducer 102*c*, and transducer 102*d* may be communicably engaged with processing module 128 via a wireless or wireline communications interface 130; and transducer 102*a*, transducer 102*b*, transducer 102*c*, and transducer 102*d* may be communicably engaged with each other in a networked configuration via a wireless or wireline communications interface 132. Wireless or wireline communications interface 130 may comprise one or more audio channels. Transducer array 102 may be configured to receive sound 30 emanating from a point source 42 within the acoustic space. Point source 42 may be a spherical point in space within the acoustic space; for example, a spherical point in space having a 20 cm radii. An acoustic wave front of sound 30 may be received by transducer array 102 via direct propagation 32 or indirect propagation 34 according to the sound propagation characteristics of the acoustic space. Transducer array 102 converts the acoustic energy of the arriving acoustic wavefront of sound 30 into an audio input 44, which is communicated to processing module 128 via communications interface 130. Each of transducers 102*a-d* may comprise a separate input channel to comprise audio input 44. In certain embodiments, transducers 102*a-d* may be located at physically spaced apart locations within the acoustic space and operably interfaced to comprise a spatially distributed array. In certain embodiments, transducers 102*a-d* may be configured as independent transducers or may alternatively be embodied as an internal microphone to an electronic device, such as a laptop or smartphone. Transducers 102*a-d* may comprise two or more individually spaced transducers and/or one or more distinct clusters of transducers 102*a-d* comprising one or more sub-arrays. The one or more sub-arrays may be located at physically spaced apart locations within the acoustic space and operably interfaced to comprise transducer array 102.

Processing module 128 may be generally comprised of an analog-to-digital converter (ADC) 104, a processor 106, a memory device 108, and a digital-to-analog converter (DAC) 118. ADC 104 may be configured to receive audio input 44 and convert audio input 44 from an acoustic audio format to a digital audio format and provide the digital audio format to processor 106 for processing. In accordance with certain embodiments, processor 106 may be configured to have approximately one million floating point operations per second (MFLOPS) for each kilohertz of sample rate of the input signals once digitized, when in seven-channel embodiments, as a reference. For a 16 KHz sample rate, therefore, approximately 16 MFLOPS would be required for operation in such an embodiment, the 16 KHz sample rate yielding an 8 KHz bandwidth, according to well-known principles of sampling theory, which is sufficient to cover the human speech intelligibility band. ADC 104 and DAC 118 may be configured to have a 16 KHz sample rate (providing approximately 8 KHz audio bandwidth) and 24-bit bit depth (providing approximately 144 dB of dynamic range, being the standard acoustic engineering ratio of the strongest to weakest signal that the system is capable of handling). Memory device 108 may be operably engaged with processor 106 to cause processor 106 to execute a plurality of audio processing functions. Memory device 108 may comprise a plurality of modules stored thereon, each module comprising a plurality of instructions to cause the processor to perform a plurality of audio processing actions. In accordance with certain embodiments, memory device 108 may comprise a modeling module 110, an audio processing module 112, a model storage module 114, and a user controls module 116. In certain embodiments, processor 106 may be operably engaged with ADC 104 to synchronize sample clocks between one or more clusters of transducers 102*a-d*, either concurrently or subsequent to converting audio input 44 from an acoustic audio format to a digital audio format. In accordance with certain aspects of the disclosure, sample clocks between one or more clusters of transducers 102*a-d* may be synchronized by wired or wirelessly connecting sample clock timing circuitry or software in a network. In non-networked embodiments, components can refer to one or more external standards, such as GPS, radio frequency clock signals, and/or variations in the conducted or radiated signals from local alternating current (A/C) power system wiring and connected electronic devices (such as lighting).

Modeling module 110 may comprise instructions for selecting an audio segment during which sound (signal) 30 emanating from point source 42 is active; converting audio input 44 to a frequency domain (via a Fourier transform or other linear function); selecting time-frequency BINs containing sufficient source location signal from the converted audio input 44; modeling propagation of the sound (signal) 30 emanating from point source 42 within the acoustic space using normalized cross power spectral density to estimate a Green's Function corresponding to the point source 42; and, exporting (to model storage module 114) the resulting propagation model and Green's Function estimate corresponding to the subject point source 42 within the acoustic space. Model storage module 114 may comprise instructions for storing the propagation model and Green's Function estimate corresponding to the subject point source 42 within the acoustic space in memory and providing said propagation model and Green's Function estimate to audio processing module 112 when requested. Model storage module 114 may further comprise instructions for storing other acoustic data, such as signals used to image a target object or audio extracted from an acoustic location.

Processing module 112 may comprise instructions for converting audio input 44 to a frequency domain via a Fourier transform or other linear function (e.g. Fast Fourier Transform); calculating a whitening filter using an inverse noise spatial correlation matrix based on the frequency domain; receiving the propagation model and Green's Function estimate from the model storage module 114; applying the propagation model and Green's Function estimate to audio input 44 to extract target frequencies from audio input 44; applying the whitening filter to audio input 44 to suppress noise, or non-target frequencies, from audio input 44; converting the extracted target frequencies from audio input 44 to a time domain via an Inverse Fourier transform or other linear function (e.g. Inverse Fast Fourier Transform); and rendering a digital audio output comprising the extracted target frequencies from point source 42.

User controls module 116 comprises instructions for receiving and processing a user input from computing device 122 to configure one or more modeling and/or processing parameters. The one or more modeling and/or processing parameters may comprise parameters for detecting and/or selecting source-location activity according to a fix threshold or adaptive threshold; and parameters for the adapt rate and frame size.

In accordance with certain embodiments, digital-to-analog converter (DAC) 118 may be operably engaged with processor 106 to convert the digital audio output comprising the extracted target frequencies from point source 42 into an analog audio output. Processing module 128 may be operably engaged with audio output device 120 to output the analog audio output via a wireless or wireline communications interface (i.e., audio channel) 46. Camera 124 and motion sensor 126 may be operably engaged with processing module 128 to capture video and/or motion data from point source 42. Modeling module 110 and audio processing module 112 may further comprise instructions for associating video and/or motion data with audio input 44 to calculate and/or refine the propagation model of sound 30, particularly those aspects involving the timing of sound source activity or inactivity and, as a consequence, when noise estimates may best be taken so as not to corrupt noise estimates with target signal.

In accordance with various preferred and alternative embodiments, system 100 may employ a different number of inputs than outputs (with one of them consisting of four or more for enhanced performance) as well as employ larger numbers of inputs and/or outputs; for example, 100 or more. In some embodiments, output drivers may be further incorporated to drive output transducers. System 100 may comprise a waveguide array coupled to transducers to provide a first stage of spatial, temporal (e.g., fixed (summation-only) or delay & sum steering), or spectral filtering. An electronic differential or summation beamformer stage may be employed to feed the acoustic channels (ADCs) to provide additional directionality, steering, or noise reduction, which is particularly useful when glimpsing (accumulating the propagation parameters of the target acoustic location). Different types of acoustic transducers may be used for the input and/or output (e.g., accelerometers, vibrators, laser vibrometry sensors, LIDAR vibration sensors, horns, loudspeakers, earbuds, and hearing aid receivers), and video camera input may be utilized for situational awareness, beamformer steering, acoustic camera functions (such as the sound field overplayed on the video image), or automatic selection of which model to load based on user or object location (e.g., in smart meeting room applications). System 100 may further employ the output transducers to illuminate a target object with penetrating acoustic waves and the input transducers to receive the reflections of the illumination, thereby enabling tomography for applications such as ultrasonic imaging and seismology. The output transducers (e.g., vibrators) may be further utilized to vibrate a target object with a fixed or varying frequency to excite natural resonant frequencies of the object or its internal structure and receive the resulting acoustic emanations by employing the input transducers (e.g., accelerometers). Example applications of such embodiments may include structural assessment in civil engineering, shipping container screening in customs and border control, and mechanical resonance testing during automobile development.

Figure 2:
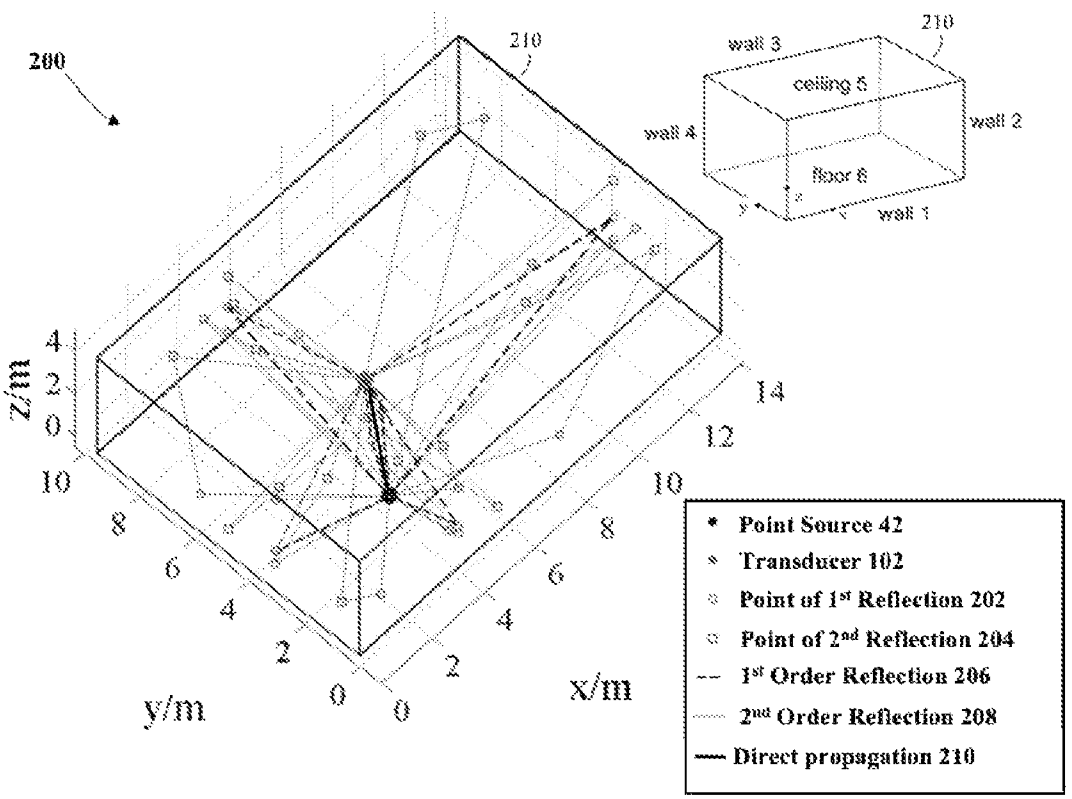
FIG. 2 is a functional diagram of an acoustic propagation model from a point source to a receiver, in accordance with various aspects of the present disclosure.

Referring now to FIG. 2, a functional diagram of an acoustic propagation model 200 from a point source 42 to a transducer 102 within an acoustic space 210 is shown. According to an embodiment, an acoustic space 210 comprises wall 1, wall 2, wall 3, wall 4, ceiling 5, and floor 6. Point source 42 may be defined as an area in space within acoustic space 210 having a spherical volume having radii of approximately 20 cm. The path of the acoustic wave energy emanating from point source 42 may be modeled according to the direct propagation of the arriving wavefront to transducer 102, and the indirect propagation of the arriving wavefront to transducer 102 comprising the first order reflections 206 defined by the points of first reflection 202 and the second order reflections 208 defined by the points of second reflection 204.

Figure 3:
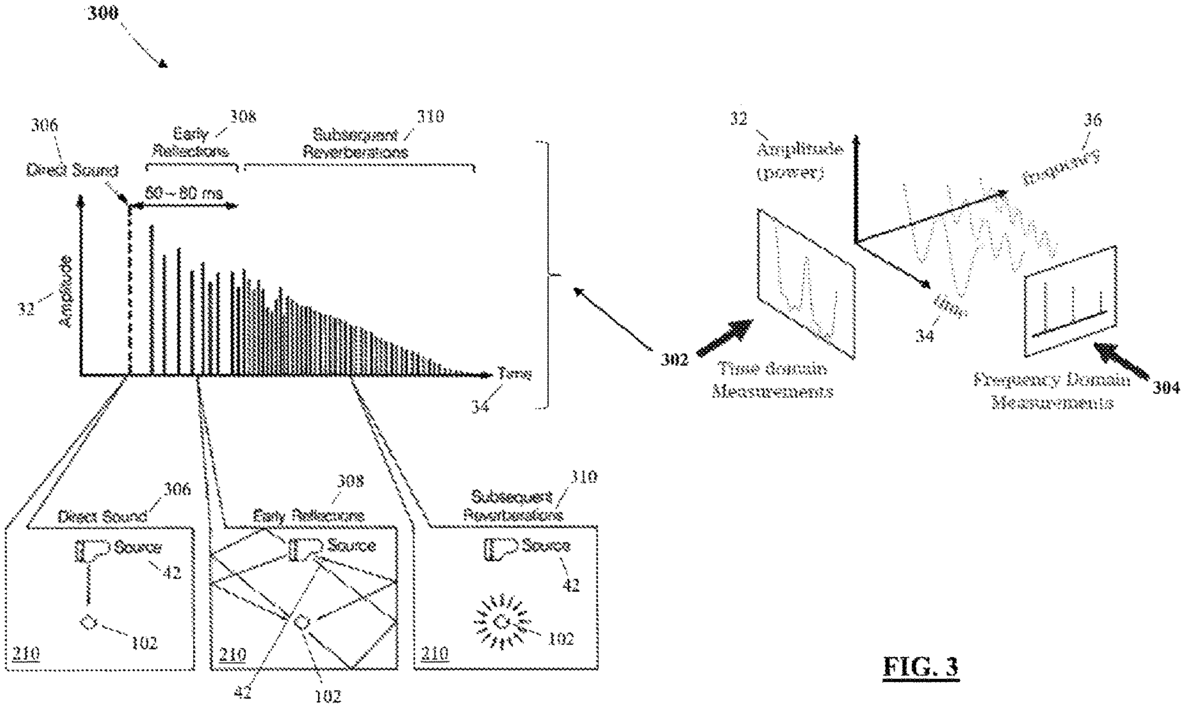
FIG. 3 is a functional diagram of frequency domain measurements derived from an acoustic propagation model, in accordance with various aspects of the present disclosure.

Referring now to FIG. 3, a functional diagram 300 of frequency domain measurements 304 derived from an acoustic propagation model is shown. According to an embodiment, sound emanating from point source 42 is received by transducer 102 within acoustic space 210. Sound propagates through acoustic space 210 to define, in relation to transducer 102, direct sound 306, early reflections 308, and subsequent reverberations 310. In accordance with certain embodiments, direct sound 306, early reflections 308, and subsequent reverberations 310 are converted into signals by transducer 102 and calculated to determine time domain measurements 302 comprising amplitude 32 and time 34. Time domain measurements 302 may be converted to frequency domain measurements 304 in order to derive spatial and temporal properties of the sound field within the frequency (or spectral) domain.

System 100 may be configured to "glimpse" the sound field arriving (i.e., receive a training input) from point source 42 to calculate spatial and temporal properties of the sound field in order to derive frequency domain values associated with the "glimpsed" sound data. In accordance with certain specific embodiments, when using raw (i.e., unfiltered) glimpse data, the target sound source should be at least 10 dB higher than the noise(s) for best performance. However, this requirement may be significantly relaxed by filtering in time or frequency domains and even more when using a combination of time and frequency domains in the glimpsing. Certain preferred embodiments employ a combination of time and frequency domains and evaluate the fast Fourier transforms of the glimpse acoustic input data frames on a bin-by-bin frequency basis to select glimpse data exceeding a 90% threshold compared to the background noise. While this particular parameter and comparison method works well with noisy data, other methods are anticipated including employing no selection or filtering in conditions with little noise during glimpsing or when certain direct propagation parameters are dominant, such as when the target acoustic location is near the array and the direct path energy overwhelms the indirect paths, so calculated direct path parameters are sufficient to achieve efficacy in system performance. System 100 may employ statistical averaging of the power spectral density followed by normalization using the spectral density to enable particularly robust estimates of the Green's Functions. However, other variations have been employed in alternative embodiments, including the use of well-known constraints in estimating the Green's Function and noise reduction such as minimum distortion. While many embodiments of system 100 calculate spatial and temporal properties of the sound field in the frequency domain, it is anticipated that frequency and time domains may be readily interchanged for many purposes through the use of transforms such as the Fast Fourier Transform.

Figure 4:
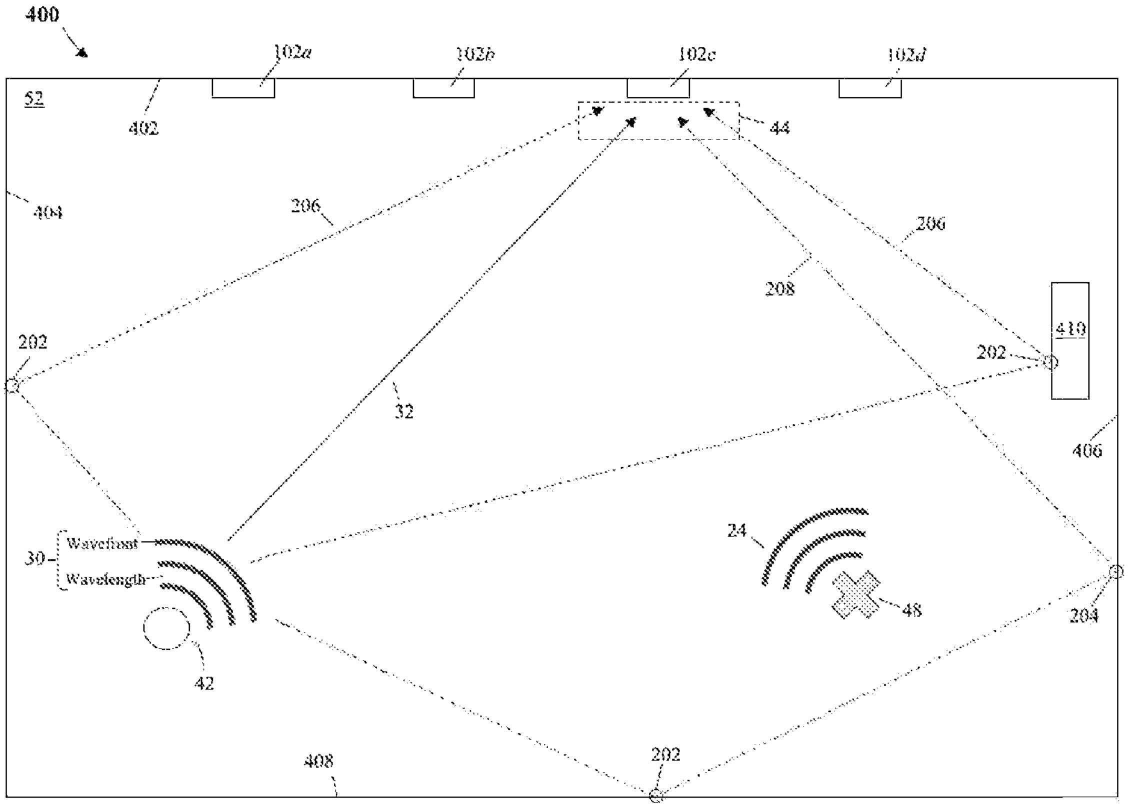
FIG. 4 is a functional diagram of a spatial audio processing system within an acoustic space, in accordance with various aspects of the present disclosure.
Figure 5:
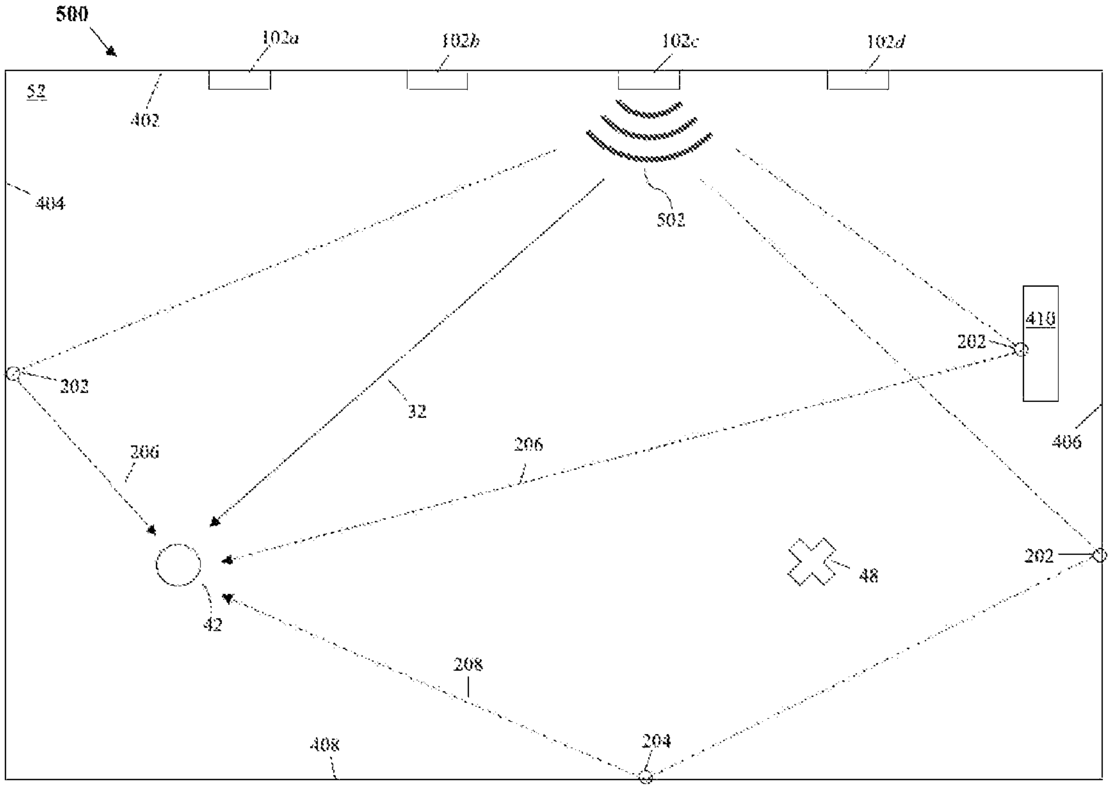
FIG. 5 is a functional diagram of a spatial audio processing system within an acoustic space, in accordance with various aspects of the present disclosure.

Referring now to FIGS. 4 and 5, a functional diagram 400 and a functional diagram 500 of a spatial audio processing system 100 within the acoustic space 52 are shown. According to an embodiment, acoustic space 52 comprises ceiling 402, wall 404, wall 406, and floor 408. Acoustic space 52 may further comprise one or more features 410 such as a table, podium, half-wall or other installed structure, and the like. Embodiments of system 100 are configured to process an acoustic audio input 44 to extract sounds (signals) 30 emanating from point source 42 and suppress noise 24 emanating from a non-target source 48 to render an acoustic audio output comprising primarily extracted and whitened audio derived from point source 42 containing little to no noise 24 audio. Referring to FIG. 5, system 100 may be configured as a bi-directional system such that the sound propagation model of acoustic space 52 may be configured to enable targeted audio output from one or more of transducers 102*a-d* to point source 42.

Figure 6:
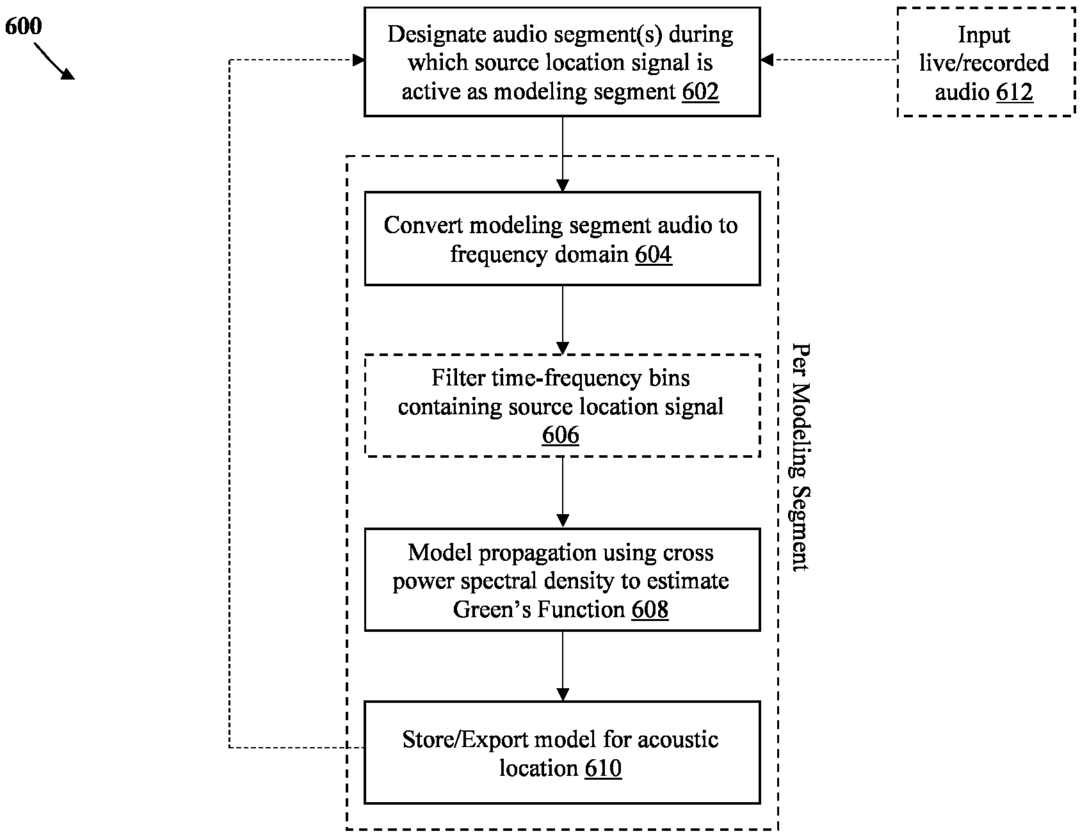
FIG. 6 is a process flow diagram of a routine for sound propagation modeling, according to an embodiment of the present disclosure.

Referring now to FIG. 6, a process flow diagram of a modeling routine 600 is shown. In accordance with certain aspects of the present disclosure, routine 600 may be implemented or otherwise embodied as a component of a spatial audio processing system; for example, spatial audio processing system 100 as shown and described in FIG. 1. According to an embodiment, modeling routine 600 is initiated by inputting or selecting one or more audio segments during which a target sound source is active (e.g., as a modeling segment) 602 to derive a target audio input or training audio input. In the context of modeling routine 600, this may be referred to as "glimpsing" the training audio data. The one or more audio segments (i.e., the "glimpsed" audio data) may be derived from a live or recorded audio input 612 corresponding to an acoustic location or environment (e.g., an interior room in a building, such as a conference room or lecture hall). In certain embodiments, modeling routine 600 is initiated by designating one or more audio segments during which a source location signal is active as a modeling segment 602. In certain embodiments, the one or more audio segments to be modeled can be designated manually (i.e., selected) or may be designated algorithmically and/or through a Rules Engine or other decision criteria, such as source location estimation, audio level, or visual triggering. In certain embodiments where visual triggering is employed, a spatial audio processing system (e.g., as shown and described in FIG. 1) may include a video camera or motion sensor configured to identify activity or sound source location as a trigger for designating the audio segment.

Modeling routine 600 may proceed by converting the target audio input or training audio input to the frequency domain 604. In some embodiments, the modeling routine converts the target audio input or training audio input from the time domain to the frequency domain via a transform such as the Fast Fourier transform or Short Time Fourier transform. However, different transform functions may be employed to convert the target audio input or training audio input from the time domain to the frequency domain. Modeling routine 600 is configured to select and/or filter time-frequency bins containing sufficient source location signal 606 and model propagation of the source signal using normalized cross power spectral density to estimate a Green's Function for the source signal 608. The propagation model and the Green's Function estimate for the acoustic location is then exported and stored for use in audio processing 610. The propagation model and the Green's Function estimate for the acoustic location may be utilized in real-time for live audio formats or may be utilized in an offline mode (i.e., not in real-time) for recorded audio formats. Steps 604, 606, and 608 may be executed on a per frame of data basis and/or per modeling segment.

Figure 7:
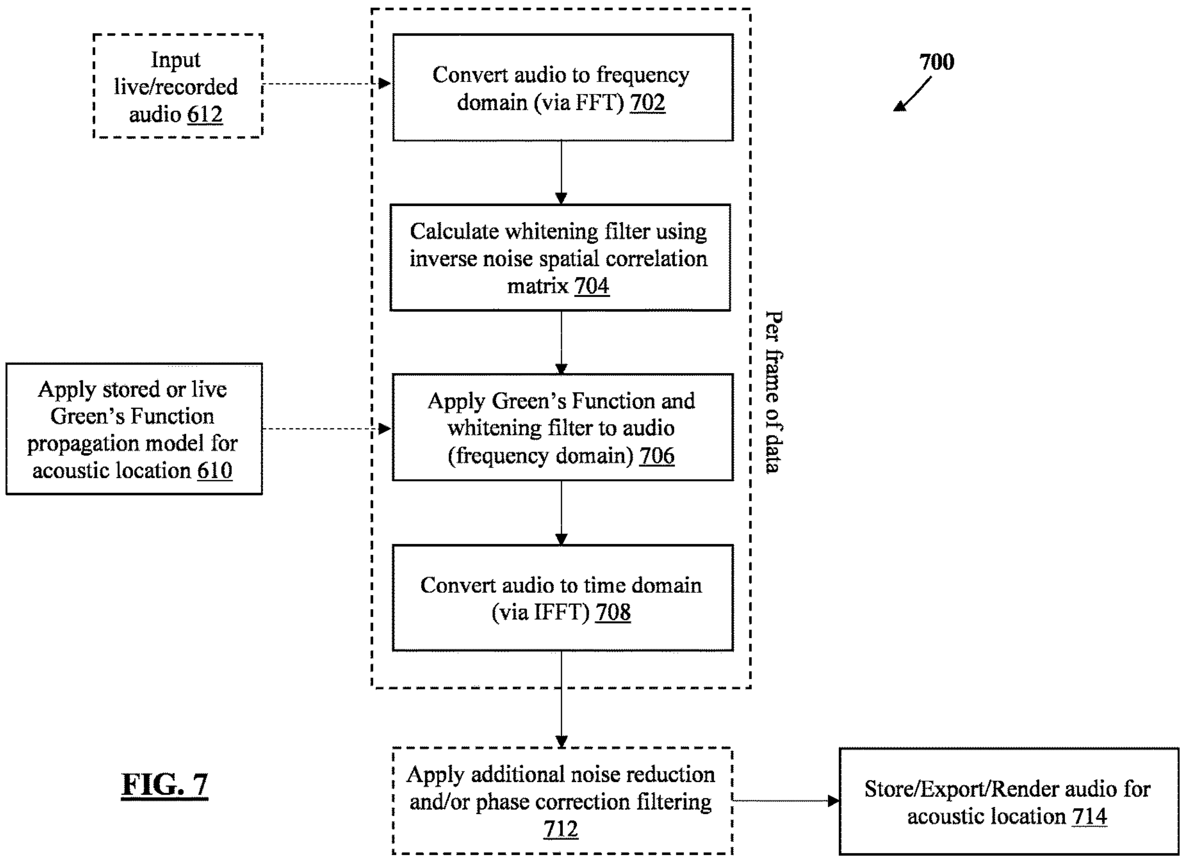
FIG. 7 is a process flow diagram of a routine for spatial audio processing, according to an embodiment of the present disclosure.

Referring now to FIG. 7, a process flow diagram of a processing routine 700 is shown. In accordance with certain aspects of the present disclosure, routine 700 may be implemented or otherwise embodied as a component of a spatial audio processing system; for example, spatial audio processing system 100 as shown and described in FIG. 1. In certain embodiments, routine 700 may be sequential or successive to one or more steps of routine 600 (as shown and described in FIG. 6). According to an embodiment, processing routine 700 may be initiated by converting a live or recorded audio input 612 from an acoustic location or environment from a time domain to a frequency domain 702. In certain embodiments, routine 700 may execute step 702 by processing audio input 612 using a transform function, e.g., a Fourier transform, Fast Fourier transform, or Short Time Fourier transform, modulated complex lapped transform, and the like. Processing routine 700 proceeds by calculating a whitening filter using inverse noise spatial correlation matrix 704 and applying the Green's Function estimate and whitening filter to the audio input within the frequency domain 706 to extract the target audio frequencies/signals and suppress the non-target frequencies/signals (i.e., noise) from the live or recorded audio input. The Green's Function estimate may be derived from the stored or live Green's Function propagation model for the acoustic location derived from step 610 of routine 600. Routine 700 may then proceed to convert the target audio frequencies back to a time domain via an inverse transform 708, such as an Inverse Fast Fourier transform. In certain embodiments, routine 700 may proceed by further processing the live or recorded audio input to apply one or more noise reduction and/or phase correction filter(s) 712 to the target audio frequencies/signals. This may be accomplished using conventional spectral subtraction or other similar noise reduction and/or phase correction techniques. Routine 700 may conclude by storing, exporting, and/or rendering an audio output comprising the extracted and whitened target audio frequencies/signals derived from the live or recorded audio input corresponding to the acoustic location or environment 714. In certain embodiments, routine 700 may be configured to execute steps 702, 704, 706, and 708 on a per frame of audio data basis.

Figure 8:
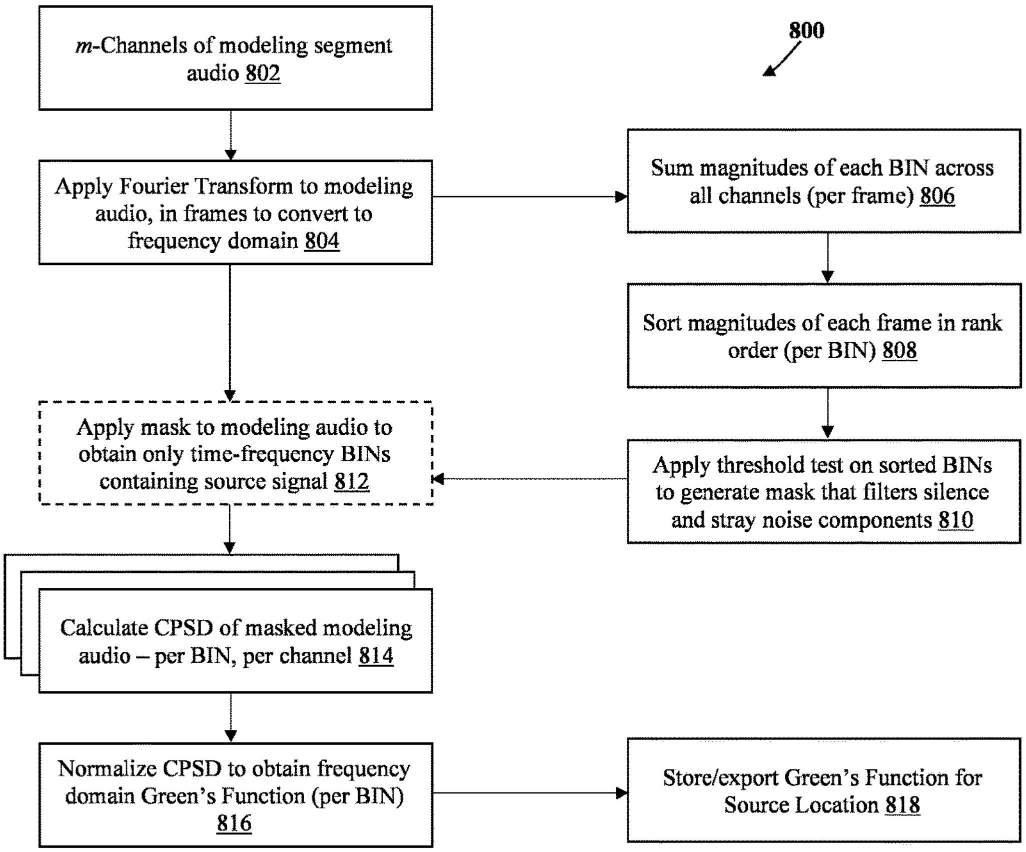
FIG. 8 is a process flow diagram of a subroutine for sound propagation modeling, according to an embodiment of the present disclosure.

Referring now to FIG. 8, a process flow diagram of a subroutine 800 for sound propagation modeling is shown. In accordance with certain aspects of the present disclosure, subroutine 800 may be implemented or otherwise embodied as a component or subcomponent of a spatial audio processing system; for example, spatial audio processing system 100 as shown and described in FIG. 1. In certain embodiments, subroutine 800 may be a subroutine of routine 600 and/or may comprise one or more sequential or successive steps of routine 600 (as shown and described in FIG. 6). In accordance with an embodiment, subroutine 800 may be initiated by receiving an audio input comprising m-Channels of modeling segment audio 802. The m-Channels are associated with one or more transducers (e.g., microphones) being located within an acoustic space or environment. The one or more transducers may be operably interfaced to comprise an array. In certain specific embodiments, a spatial audio processing system may comprise four or more audio input channels. Subroutine 800 may continue by applying a Fourier Transform to the modeling segment audio, in frames, to convert the modeling segment audio from the time domain to the frequency domain 804. As in routine 600, the Fourier Transform in subroutine 800 may be selected from one or more alternative transform functions, such as Fast Fourier transform, Short Time Fourier transform and/or other window functions or overlap. Subroutine 800 may continue by executed one or more substeps 806, 808, and 810. In certain embodiments, subroutine 800 may proceed by summing (on a per frame basis) the magnitudes of each binary file, or BIN, for each channel of audio 806. The magnitudes of each frame may be sorted in rank order, per BIN 808. Subroutine 800 may apply a magnitude threshold test on the sorted BINs to generate a mask configured to filter silence and stray noise components from the m-Channels of modeling segment audio 810. It is anticipated that alternative techniques to the magnitude threshold test may be employed to generate a temporal and/or spectral mask in substep 810. In certain embodiments, subroutine 800 may continue by applying the mask to the modeling audio segment to obtain only time-frequency BINs containing the source signal 812. Subroutine 800 may continue by calculating the cross power spectral density (CPSD) of the masked modeling audio segment for each BIN, for each of the m-Channels of audio 814. Subroutine 800 may continue by normalizing the CPSD to obtain a frequency domain Green's Function for each BIN 816 to identify an audio propagation model originating from a three-dimensional point source within the audio environment/location. In certain embodiments, the Green's Function data may be continuously updated/refined in response to changing conditions/variables, including tracking a target sound source as it moves to one or more new/different locations within the audio environment/location. Subroutine 800 may conclude by storing/exporting the Green's Function for the point source location within the audio environment 818.

Figure 9:
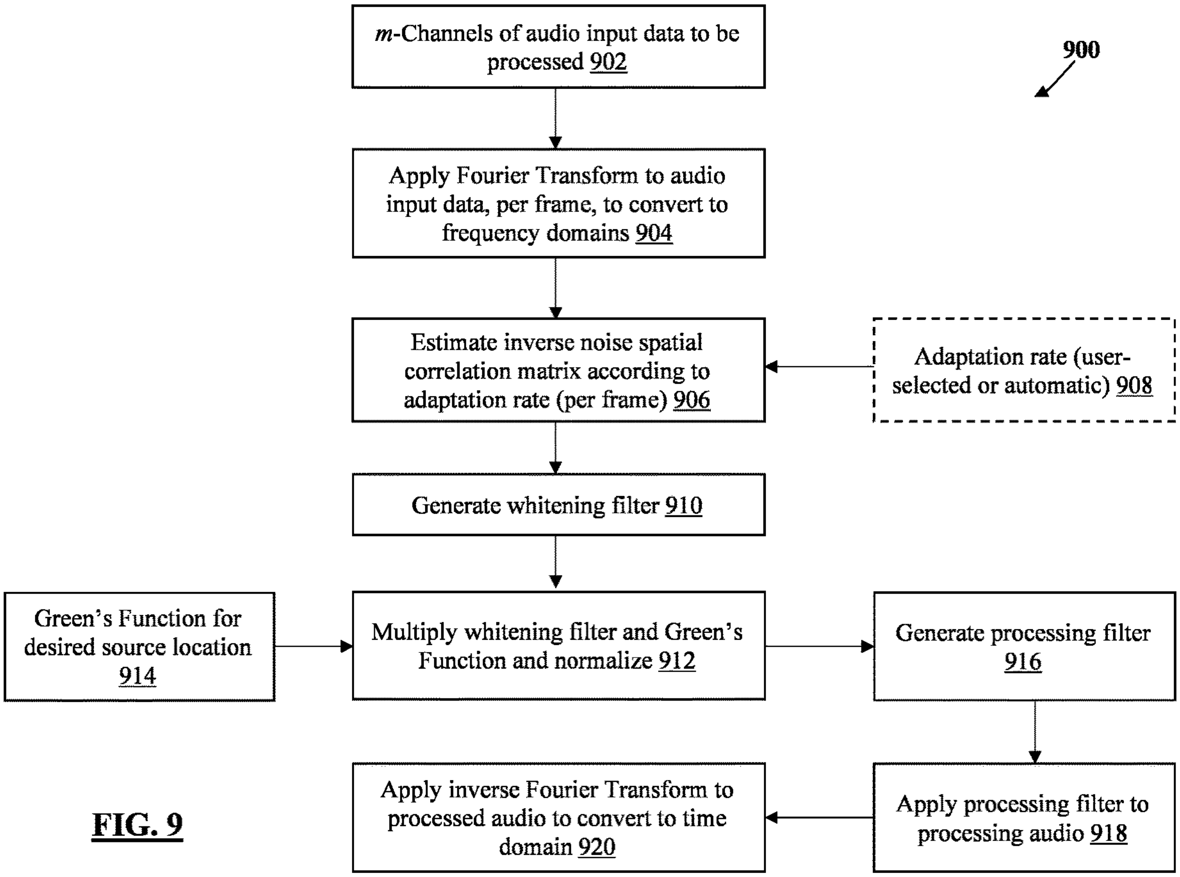
FIG. 9 is a process flow diagram of a subroutine for spatial audio processing, according to an embodiment of the present disclosure.

Referring now to FIG. 9, a process flow diagram of a subroutine 900 for spatial audio processing is shown. In accordance with certain aspects of the present disclosure, subroutine 900 may be implemented or otherwise embodied as a component or subcomponent of a spatial audio processing system; for example, spatial audio processing system 100 as shown and described in FIG. 1. In certain embodiments, subroutine 900 may be a subroutine of routine 700 and/or may comprise one or more sequential or successive steps of routine 700 (as shown and described in FIG. 7). In accordance with an embodiment, subroutine 900 may be initiated by receiving an audio input comprising m-Channels of audio input data to be processed 902. The m-Channels are associated with one or more transducers (e.g., microphones) being located within an acoustic space or environment. The one or more transducers may be operably interfaced to comprise an array. In certain specific embodiments, a spatial audio processing system may comprise four or more audio input channels. In certain embodiments, an increase in the number of channels and/or lengthening the processing frame size of the audio input data may improve source separation performance. Subroutine 900 may continue by applying a Fourier Transform to each frame of audio input data to convert the audio input data from the time domain to the frequency domain. As in subroutine 800, the Fourier Transform in subroutine 900 may be selected from one or more alternative transform functions, such as Fast Fourier transform, Short Time Fourier transform and/or other window functions or overlap. Subroutine 900 may continue by estimating an inverse noise spatial correlation matrix according to an adaptation rate, per frame of audio input data 906. The adaptation rate may be manually selected by the user or may be automatically selected 908 via a selection algorithm or rules engine within subroutine 900. Subroutine 900 may utilize the inverse noise spatial correlation matrix to generate a whitening filter 910. It is anticipated that subroutine 900 may employ alternative methods to the inverse noise spatial correlation matrix to generate the whitening filter. In certain embodiments, the whitening filter enables improved SNR in the processed audio. In certain embodiments, whitening filter 910 may be continuously updated on a frame-by-frame basis. In other embodiments, whitening filter 910 may be updated in response to a trigger condition, such as by a source activity detector indicating "false," (i.e., an indication that only noise is present to be used in the noise estimate). Subroutine 900 may utilize the Green's Function data for the target source location 914 to multiply the whitening filter and Green's Function, normalize the results 912 and generate a processing filter 916. The processing filter is then applied to the audio input data to be processed 918. Subroutine 900 may conclude by applying an inverse Fourier Transform to the processed audio input data to convert the audio data from the frequency domain back to the time domain 920.

Figure 10:
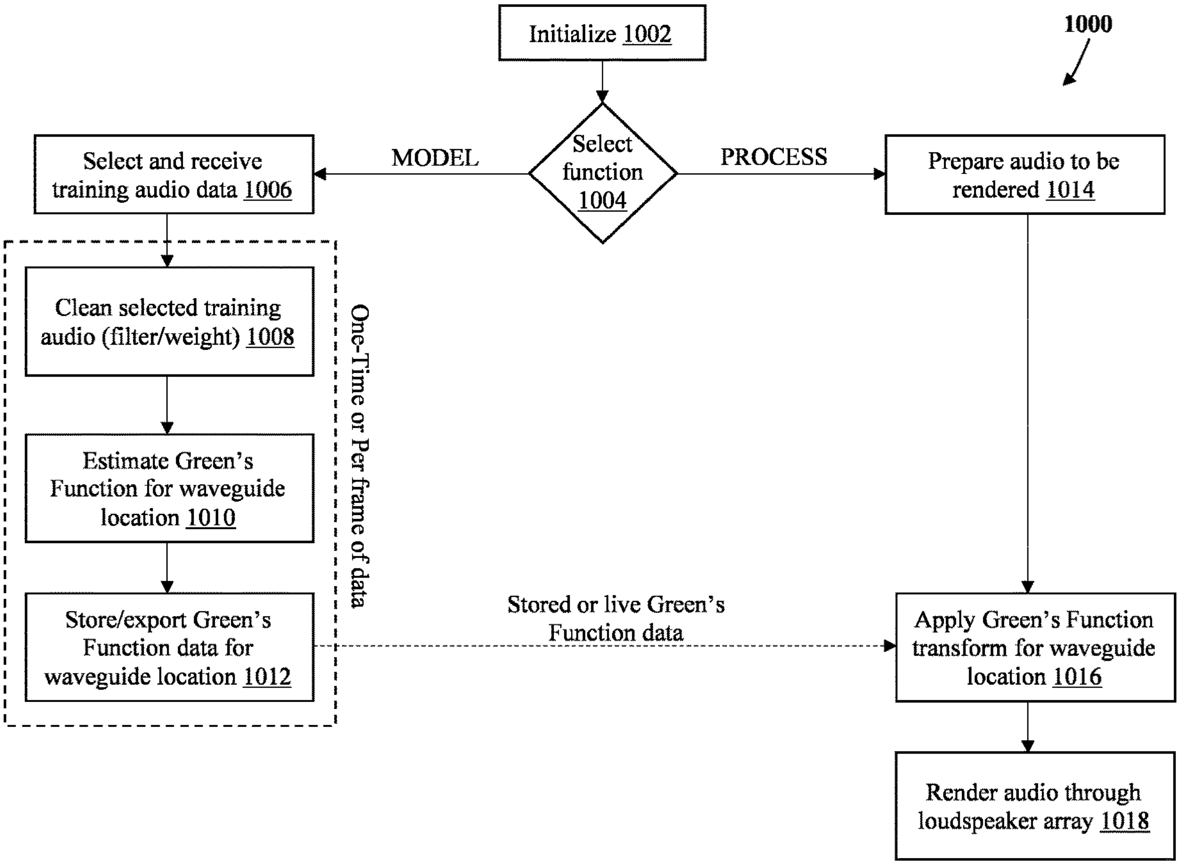
FIG. 10 is a process flow diagram of a routine for audio rendering, according to an embodiment of the present disclosure.

Referring now to FIG. 10, a process flow diagram of a routine 1000 for audio rendering is shown. In accordance with certain aspects of the present disclosure, routine 1000 may be implemented or otherwise embodied within a bi-directional spatial audio processing system; for example, spatial audio processing system 100 as shown and described in FIG. 1. In accordance with an embodiment, routine 1000 may be initialized 1002 manually or automatically in response to one or more trigger conditions. Routine 1000 may begin by selecting a modeling or processing function 1004. In accordance with a modelling function, routine 1000 may select and receive training audio data 1006. The training audio data may be cleaned (i.e., filter and weight) 1008. Routine 1000 may estimate a Green's Function for a waveguide location 1010 and store/export the Green's Function data corresponding to the waveguide location 1012. In accordance with certain embodiments, steps 1008, 1010, and 1012 may be executed one-time or per frame of training audio data. In accordance with a processing function, routine 1000 may prepare an audio file to be rendered 1014. In accordance with certain embodiments, routine 1000 may apply a Green's Function transform for the target waveguide location to the audio file 1016 and render the audio through a loudspeaker array corresponding to the waveguide location 1018.

Figure 11:
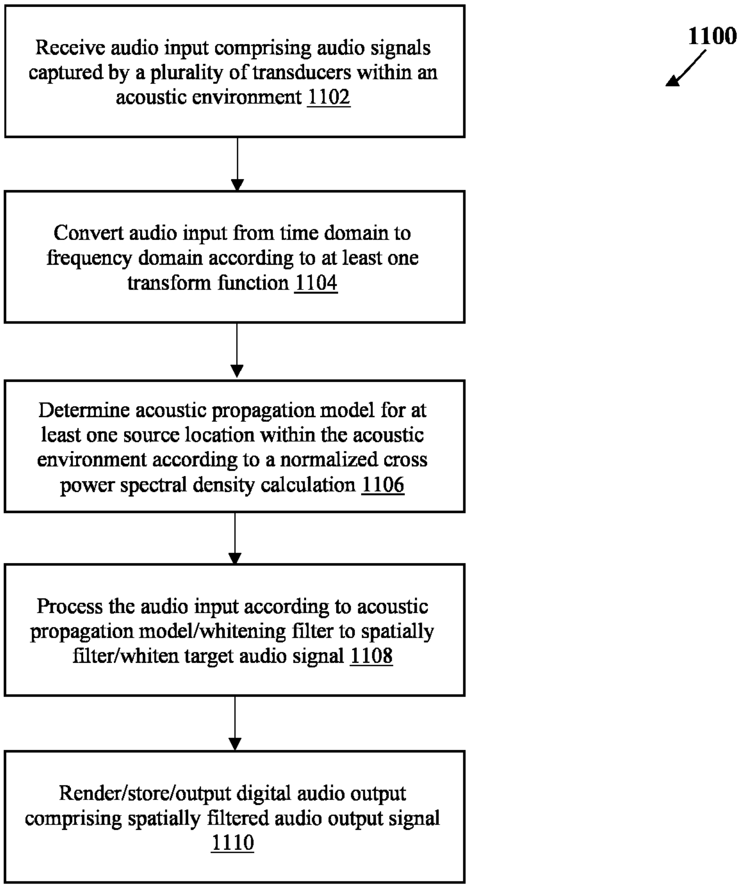
FIG. 11 is a process flow diagram for a spatial audio processing method, according to an embodiment of the present disclosure.

Referring now to FIG. 11, a process flow diagram for a spatial audio processing method 1100 is shown. According to certain aspects of the present disclosure, method 1100 may comprise one or more of process steps 1102-1110. In certain embodiments, method 1100 may be implemented, in whole or in part, within system 100 (as shown in FIG. 1). In certain embodiments, method 1100 may be embodied within one or more aspects of routine 600 and/or subroutine 700 (as shown in FIGS. 6-7). In certain embodiments, method 1100 may be embodied within one or more aspects of routine 800 and/or subroutine 900 (as shown in FIGS. 8-9). In certain embodiments, method 1100 may be embodied within one or more aspects of routine 1000 (as shown in FIG. 10). In accordance with certain aspects of the present disclosure, method 1100 may comprise receiving an audio input comprising audio signals captured by a plurality of transducers within an acoustic environment (step 1102). Method 1100 may proceed by converting the audio input from a time domain to a frequency domain according to at least one transform function (step 1104). In certain embodiments, the at least one transform function is selected from the group consisting of Fourier transform, Fast Fourier transform, Short Time Fourier transform and modulated complex lapped transform. In accordance with certain embodiments, the at least one transform function comprises an auditory filter bank. Auditory filter banks, including cochlear filter banks and linear filter banks and non-linear filter banks, are non-uniform bandpass filter banks designed to imitate the frequency resolution of human hearing. Classical auditory filter banks include constant-Q filter banks such as the widely used third-octave filter bank. Digital constant-Q filter banks have also been developed for audio applications. Constant-Q filter banks for audio have been devised based on the wavelet transform, including the auditory wavelet filter bank. Auditory filter banks have also been based more directly on psychoacoustic measurements, leading to approximations of the auditory filter frequency response in terms of a Gaussian function, a "rounded exponential," and more recently the gammatone (or "Patterson-Holdsworth") filter bank. The gamma-chirp filter bank further adds a level-dependent asymmetric correction to the basic gammatone channel frequency response, thus providing a more accurate approximation to the auditory frequency response. The output power from an auditory filter bank at a particular time defines the so-called excitation pattern versus frequency at that time. It may be considered analogous to the average power of the physical excitation applied to the hair cells of the inner ear by the vibrating basilar membrane in the cochlea. The shape of the excitation pattern can thus be thought of as approximating the envelope of the basilar membrane vibration. The excitation pattern produced from an auditory filter bank, together with appropriate equalization (frequency-dependent gain) and nonlinear compression, can be used to define specific loudness as a function of time and frequency. Because the channels of an auditory filter bank are distributed non-uniformly versus frequency, they can be regarded as a basis for a non-uniform sampling of the frequency axis. In this point of view, the auditory-filter frequency response becomes the (frequency-dependent) interpolation kernel used to extract a frequency sample at the filter's center frequency. Method 1100 may proceed by determining at least one acoustic propagation model for at least one source location within the acoustic environment according to a normalized cross power spectral density calculation (step 1106). In certain embodiments, the at least one acoustic propagation model may comprise at least one Green's Function estimation. Method 1100 may proceed by processing the audio input according to the at least one acoustic propagation model to spatially filter at least one target audio signal from one or more non-target audio signals (step 1108). In certain embodiments, the target audio signal may correspond to the at least one source location within the acoustic environment. In certain embodiments, step 1108 may further comprise applying a whitening filter to a spatially filtered target audio signal to derive at least one separated audio output signal, concurrently or concomitantly with the at least one acoustic propagation model. Method 1100 may proceed by rendering or outputting a digital audio output comprising the at least one separated audio output signal (step 1110). In certain embodiments, step 1110 may be preceded by one or more steps for performing at least one inverse transform function to convert the at least one separated audio output signal from a frequency domain to a time domain. In certain embodiments, step 1110 may be preceded by one or more steps for applying a spectral subtraction noise reduction filter to the at least one separated audio output signal. In certain embodiments, step 1110 may be preceded by one or more steps for applying a phase correction filter to the spatially filtered target audio signal.

In certain embodiments, method 1100 may further comprise determining two or more acoustic propagation models associated with two or more source locations within the acoustic environment and storing each acoustic propagation model in the two or more acoustic propagation models in a computer-readable memory device. Method 1100 may further comprise creating a separate whitening filter for each acoustic propagation model in the two or more acoustic propagation models. In accordance with certain embodiments in which method 1100 is implemented in a live audio application, method 1100 may further comprise receiving, in real-time, at least one sensor input comprising sound source localization data for at least one sound source. In accordance with such live audio embodiments, method 1100 may further comprise determining, in real-time, the at least one source location according to the sound source localization data.

Figure 12:
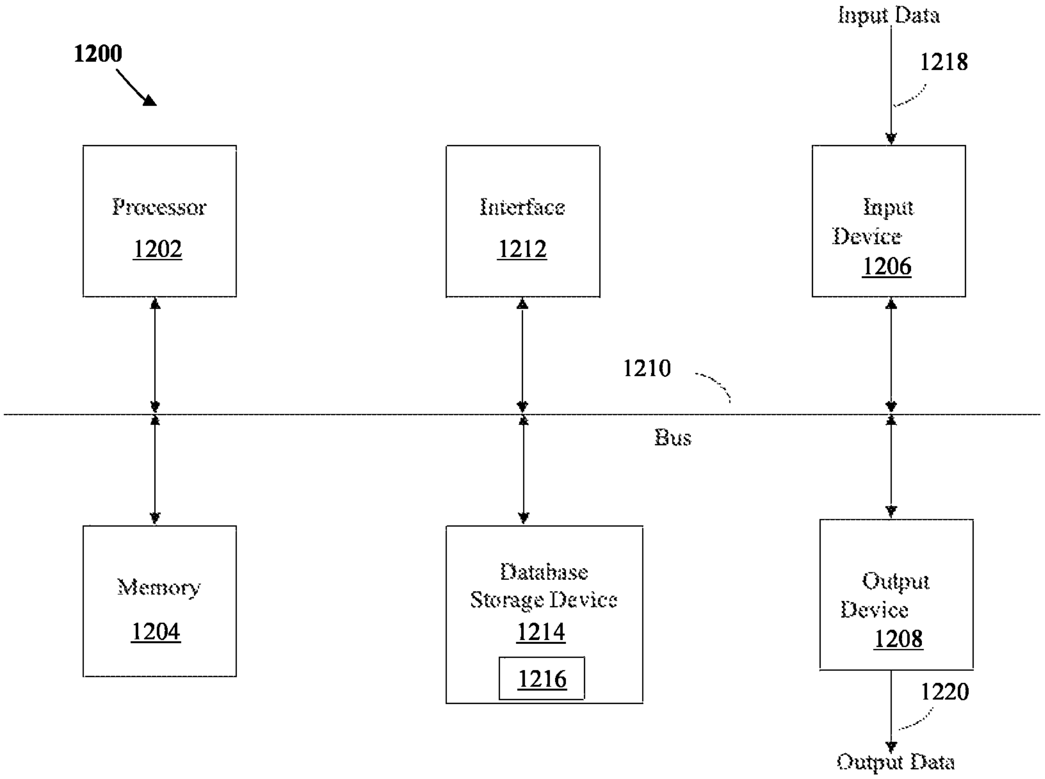
FIG. 12 is a functional block diagram of a processor-implemented computing device in which one or more aspects of the present disclosure may be implemented.

Referring now to FIG. 12, a processor-implemented computing device in which one or more aspects of the present disclosure may be implemented is shown. According to an embodiment, a processing system 1200 may generally comprise at least one processor 1202, or a processing unit or plurality of processors, memory 1204, at least one input device 1206 and at least one output device 1208, coupled together via a bus or a group of buses 1210. In certain embodiments, input device 1206 and output device 1208 could be the same device. An interface 1212 can also be provided for coupling the processing system 1200 to one or more peripheral devices, for example interface 1212 could be a PCI card or a PC card. At least one storage device 1214 which houses at least one database 1216 can also be provided. The memory 1204 can be any form of memory device, for example, volatile or non-volatile memory, solid state storage devices, magnetic devices, etc. The processor 1202 can comprise more than one distinct processing device, for example to handle different functions within the processing system 1200. Input device 1206 receives input data 1218 and can comprise, for example, a keyboard, a pointer device such as a pen-like device or a mouse, audio receiving device for voice-controlled activation such as a microphone, data receiver or antenna such as a modem or a wireless data adaptor, a data acquisition card, etc. Input data 1218 can come from different sources, for example keyboard instructions in conjunction with data received via a network. Output device 1208 produces or generates output data 1220 and can comprise, for example, a display device or monitor in which case output data 1220 is visual, a printer in which case output data 1220 is printed, a port, such as for example a USB port, a peripheral component adaptor, a data transmitter or antenna such as a modem or wireless network adaptor, etc. Output data 1220 can be distinct and/or derived from different output devices, for example a visual display on a monitor in conjunction with data transmitted to a network. A user could view data output, or an interpretation of the data output, on, for example, a monitor or using a printer. The storage device 1214 can be any form of data or information storage means, for example, volatile or non-volatile memory, solid state storage devices, magnetic devices, etc.

In use, the processing system 1200 is adapted to allow data or information to be stored in and/or retrieved from, via wired or wireless communication means, at least one database 1216. The interface 1212 may allow wired and/or wireless communication between the processing unit 1202 and peripheral components that may serve a specialized purpose. In general, the processor 1202 can receive instructions as input data 1218 via input device 1206 and can display processed results or other output to a user by utilizing output device 1208. More than one input device 1206 and/or output device 1208 can be provided. It should be appreciated that the processing system 1200 may be any form of terminal, server, specialized hardware, or the like.

It is to be appreciated that the processing system 1200 may be a part of a networked communications system. Processing system 1200 could connect to a network, for example the Internet or a WAN. Input data 1218 and output data 1220 can be communicated to other devices via the network. The transfer of information and/or data over the network can be achieved using wired communications means or wireless communications means. The transfer of information and/or data over the network may be synchronized according to one or more data transfer protocols between central and peripheral device(s). In certain embodiments, one or more central/master device may serve as a broker between one or more peripheral/slave device(s) for communication between one or more networked devices and a server. A server can facilitate the transfer of data between the network and one or more databases. A server and one or more database(s) provide an example of a suitable information source.

Thus, the processing computing system environment 1200 illustrated in FIG. 12 may operate in a networked environment using logical connections to one or more remote computers. In embodiments, the remote computer may be a personal computer, a server, a router, a network PC, a peer device, or other common network node, and typically includes many or all of the elements described above.

It is to be further appreciated that the logical connections depicted in FIG. 12 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 1200 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 1200, or portions thereof, may be stored in a remote memory storage device. It is to be appreciated that the illustrated network connections of FIG. 12 are exemplary and other means of establishing a communications link between multiple computers may be used.

FIG. 12 is intended to provide a brief, general description of an illustrative and/or suitable exemplary environment in which embodiments of the invention may be implemented. That is, FIG. 12 is but an example of a suitable environment and is not intended to suggest any limitations as to the structure, scope of use, or functionality of embodiments of the present invention exemplified therein. A particular environment should not be interpreted as having any dependency or requirement relating to any one or a specific combination of components illustrated in an exemplified operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 1200 of FIG. 12. As such, it will be understood that such acts and operations, which are at times referred to as being computer-executed, include the manipulation by the processor of the computer of electrical signals representing data in a structured form. This manipulation transforms data or maintains it at locations in the memory system of the computer, which reconfigures or otherwise alters the operation of the computer in a manner that is conventionally understood by those skilled in the art. The data structures in which data is maintained are physical locations of the memory that have particular properties defined by the format of the data. However, while certain embodiments may be described in the foregoing context, the scope of the disclosure is not meant to be limiting thereto, as those of skill in the art will appreciate that the acts and operations described hereinafter may also be implemented in hardware.

Figure 13:
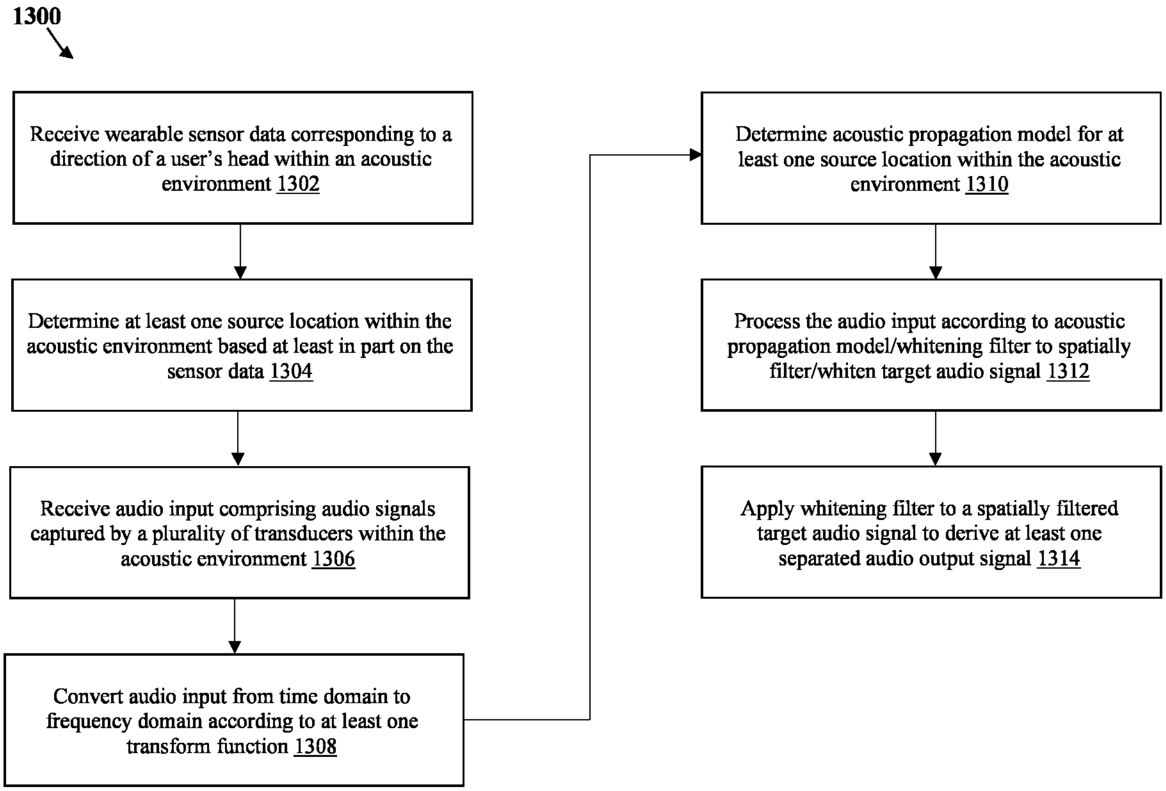
FIG. 13 is a process flow diagram for a spatial audio processing method, according to an embodiment of the present disclosure.
Figure 14:
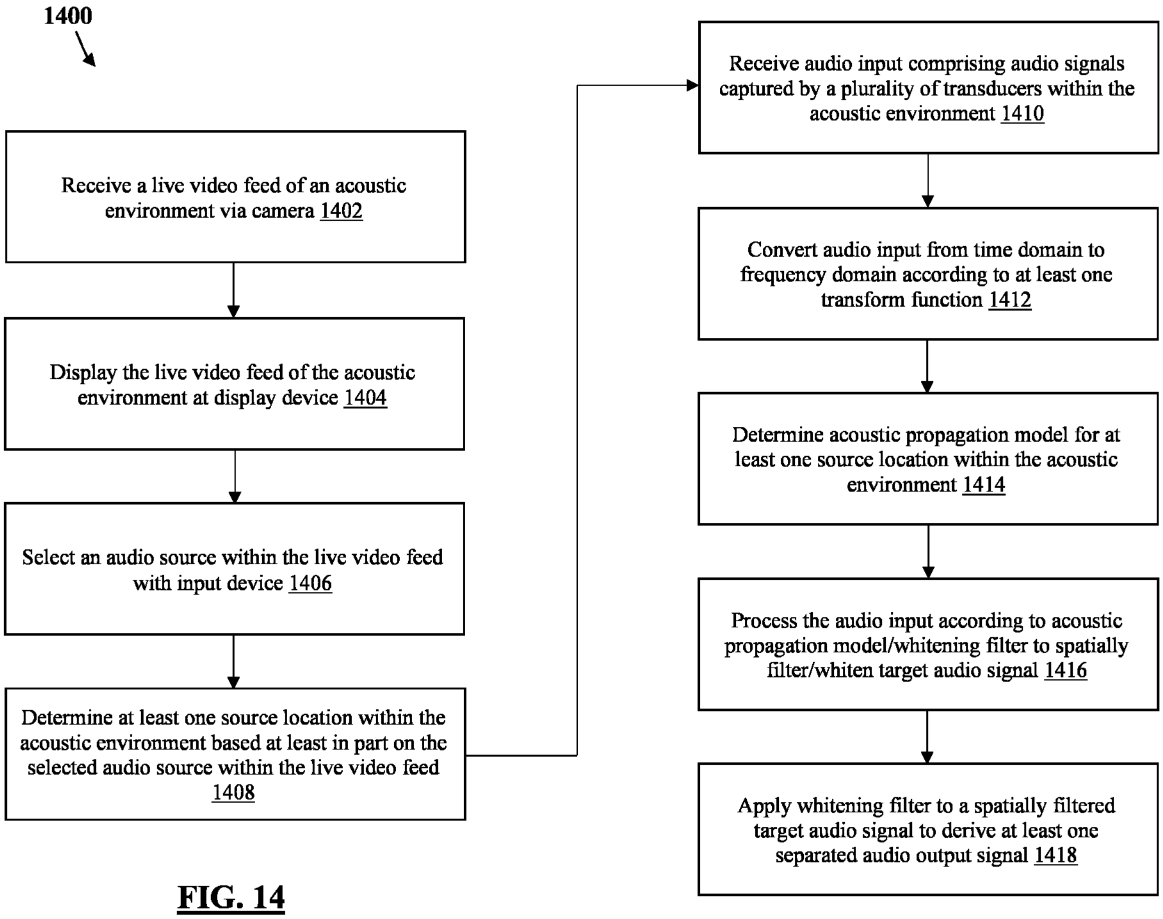
FIG. 14 is a process flow diagram for a spatial audio processing method, according to an embodiment of the present disclosure.

Referring now to FIGS. 13 and 14, methods for spatial audio processing may include one or more methods for designating a desired general listening direction for spatially filtering at least one target audio signal from one or more non-target audio signals. In accordance with certain aspects of the present disclosure, a spatial audio processing method enables a user to designate a listening direction (e.g., within a user interface) and a spatial audio modeling algorithm ranks the loudest sounds in that direction and discards sounds that arrive from other directions. Sound direction is determined based on time delay of arrival or similar known techniques, as described herein. The user's desired general listening direction is determined by any of several different means, such as the direction that the user's head is pointed as measured and reported by a sensor embedded in one or more wearable device (e.g., ear buds, eyeglasses, or other wearable or handheld device) or clicking/touching on a display of a live video feed of an acoustic audio environment. In accordance with certain aspects of the present, a user-directed and/or sensor-driven designation of sound source direction may provide for certain system benefits including: (1) reduce computational burden on the spatial audio processing algorithm and associated hardware; (2) reduce the chance that an undesired source is modeled and separated; and (3) automate the modeling and separation of desired sources. If a model has already been calculated for the highest sound source located along the desired general listening direction, then the audio propagation model for that location would be selected—thereby saving time, computational burden, and power consumption. In accordance with certain aspects of the present disclosure, a sound source location could be determined in real-time using a wearable sensor device. Alternatively, a spatial audio processing system may comprise a graphical user interface configured to enable a user to click on a display of a live video feed of an acoustic environment to choose the direction/location of a desired listening direction and/or audio source. In post processing applications (e.g., audio forensics) or live security monitoring applications (e.g., manned home/office security center), a spatial audio processing system comprising a graphical user interface may enable the user to click on a video display where video is captured along with array audio for one or more microphones/transducers. In certain embodiments that utilize video, the spatial audio processing system and method may further refine when and where to calculate a new (or load an existing) model based on detecting the lip motion of a desired talker or any talker in the desired general listening direction.

Referring further to FIG. 13, a method 1300 for spatial audio processing is shown. In accordance with certain aspects of the present disclosure, method 1300 may comprise one or more of process steps 1302-1314. In certain embodiments, method 1300 may be implemented, in whole or in part, within system 100 (as shown in FIG. 1). In certain embodiments, method 1300 may be embodied within one or more aspects of routine 600 and/or subroutine 700 (as shown in FIGS. 6-7). In certain embodiments, method 1300 may be embodied within one or more aspects of routine 800 and/or subroutine 900 (as shown in FIGS. 8-9). In certain embodiments, method 1300 may be embodied within one or more aspects of routine 1000 (as shown in FIG. 10). In accordance with certain aspects of the present disclosure, method 1300 may comprise one or more steps or operations for receiving, with at least one wearable sensor, sensor data corresponding to a direction of a user's head within an acoustic environment (Step 1302). Method 1300 may proceed by executing one or more steps or operations for determining, with at least one processor, at least one source location within the acoustic environment based at least in part on the sensor data (Step 1304). Method 1300 may proceed by executing one or more steps or operations for receiving, with an audio processor, an audio input comprising audio signals captured by a plurality of transducers within the acoustic environment (Step 1306). Method 1300 may proceed by executing one or more steps or operations for converting, with the audio processor, the audio input from a time domain to a frequency domain according to at least one transform function (Step 1308). Method 1300 may proceed by executing one or more steps or operations for determining, with the audio processor, at least one acoustic propagation model for at least one source location (Step 1310). Method 1300 may proceed by executing one or more steps or operations for processing, with the audio processor, the audio input according to the at least one acoustic propagation model to spatially filter at least one target audio signal from one or more non-target audio signals, wherein the at least one target audio signal corresponds to the at least one source location within the acoustic environment (Step 1312). Method 1300 may proceed by executing one or more steps or operations for applying, with the audio processor, a whitening filter to a spatially filtered target audio signal to derive at least one separated audio output signal (Step 1314).

Referring further to FIG. 14, a method 1400 for spatial audio processing is shown. In accordance with certain aspects of the present disclosure, method 1400 may comprise one or more of process steps 1402-1418. In certain embodiments, method 1400 may be implemented, in whole or in part, within system 100 (as shown in FIG. 1). In certain embodiments, method 1400 may be embodied within one or more aspects of routine 600 and/or subroutine 700 (as shown in FIGS. 6-7). In certain embodiments, method 1400 may be embodied within one or more aspects of routine 800 and/or subroutine 900 (as shown in FIGS. 8-9). In certain embodiments, method 1400 may be embodied within one or more aspects of routine 1000 (as shown in FIG. 10). In accordance with certain aspects of the present disclosure, method 1400 may comprise one or more steps or operations for receiving, with at least one camera, a live video feed of an acoustic environment (Step 1402). Method 1400 may proceed by executing one or more steps or operations for displaying, on at least one display device, the live video feed of the acoustic environment (Step 1404). Method 1400 may proceed by executing one or more steps or operations for selecting, with at least one input device, an audio source within the live video feed (Step 1406). Method 1400 may proceed by executing one or more steps or operations for determining, with at least one processor, at least one source location within the acoustic environment based at least in part on the selected audio source within the live video feed (Step 1408). Method 1400 may proceed by executing one or more steps or operations for receiving, with an audio processor, an audio input comprising audio signals captured by a plurality of transducers within the acoustic environment (Step 1410). Method 1400 may proceed by executing one or more steps or operations for converting, with the audio processor, the audio input from a time domain to a frequency domain according to at least one transform function (Step 1412). Method 1400 may proceed by executing one or more steps or operations for determining, with the audio processor, at least one acoustic propagation model for the at least one source location (Step 1414). Method 1400 may proceed by executing one or more steps or operations for processing, with the audio processor, the audio input according to the at least one acoustic propagation model to spatially filter at least one target audio signal from one or more non-target audio signals, wherein the at least one target audio signal corresponds to the at least one source location within the acoustic environment (Step 1416). Method 1400 may proceed by executing one or more steps or operations for applying, with the audio processor, a whitening filter to a spatially filtered target audio signal to derive at least one separated audio output signal (Step 1418).

Certain aspects of the present disclosure provide for one or more (e.g., an ensemble) of Machine Learning (ML) or Deep Learning (DL) techniques for spatially filtering a target audio signal from one or more non-target audio signal in a live or recording audio input. In accordance with certain aspects of the present disclosure, the ensemble of ML/DL techniques comprises an ML framework. The ML framework may comprise one or more artificial neural network (ANN) for modeling an acoustic propagation model for a sound source location within an acoustic environment and/or processing an audio input to spatially filter a target audio signal from one or more non-target audio signals according to the acoustic propagation model. In accordance with certain embodiments, the ML framework may include one or more ANN frameworks, including but not limited to, convolutional recurrent neural network (CRNN), Deep Neural Network (DNN), a cascade-correlation neural network, convolutional neural network (CNN) and the like. In accordance with certain aspects of the present disclosure, embodiments of a spatial audio processing method and system in which one or more ML framework is employed may comprise one or more ML hardware components, including but not limited to, one or more analog and mixed signal processing semiconductors, such as reconfigurable analog modular processors; one or more digital neural network semiconductors; one or more digital signal processors; and one or more optical processing components (e.g., camera 124, and motion sensor 126, shown in FIG. 1). In accordance with certain embodiments, the one or more ML hardware components may be operably engaged with an audio processor to perform the spatial audio processing method of the present disclosure.

In accordance with certain aspects of the present disclosure, the special audio processing method and system may employ a CNN and/or a CRNN for one or more modeling or processing operations. A CNN learns highly non-linear mappings by interconnecting layers of artificial neurons arranged in many different layers with non-linear activation functions. A CNN architecture comprises one or more convolutional layers interspersed with one or more sub-sampling layers or non-linear layers, which are typically followed by one or more fully connected layers. Each element of the CNN receives inputs from a set of features in the previous layer. The CNN learns concurrently because the neurons in the same feature map (or output image) have identical weights or parameters. These local shared weights reduce the complexity of the network such that when multi-dimensional input data enters the network, the CNN reduces the complexity of data reconstruction in the feature extraction and regression or classification process.

During training, a CNN is adjusted or trained so that the input data leads to a specific output estimate. The CNN is adjusted using back propagation based on a comparison of the output estimate and the ground truth (i.e., true label) until the output estimate progressively matches or approaches the ground truth. The CNN is trained by adjusting the weights (w) or parameters between the neurons based on the difference between the ground truth and the actual output. The weights between neurons are free parameters that capture the model's representation of the data and are learned from input/output samples. The goal of model training is to find parameters (w) that minimize an objective loss function L(w), which measures the fit between the predictions of the model parameterized by w and the actual observations or the true label of a sample. The most common objective loss functions are the cross-entropy for classification and mean-squared error for regression. In other implementations, the CNN uses different loss functions such as Euclidean loss and softmax loss.

Currently CNNs are trained with stochastic gradient descent (SGD) using mini-batches. SDG is an iterative method for optimizing a differentiable objective function (e.g., loss function), a stochastic approximation of gradient descent optimization. Many variants of SGD are used to accelerate learning. Some popular heuristics, such as AdaGrad, AdaDelta, and RMSprop tune a learning rate adaptively for each feature. AdaGrad, arguably the most popular, adapts the learning rate by caching the sum of squared gradients with respect to each parameter at each time step. The step size for each feature is multiplied by the inverse of the square root of this cached value. AdaGrad leads to fast convergence on convex error surfaces, but because the cached sum is monotonically increasing, the method has a monotonically decreasing learning rate, which may be undesirable on highly nonconvex loss surfaces. Momentum methods are another common SGD variant used to train neural networks. These methods add to each update a decaying sum of the previous updates. In other implementations, the gradient is calculated using only selected data pairs fed to a Nesterov's accelerated gradient and an adaptive gradient to inject computation efficiency. The major shortcoming of training using gradient descent, as well as its variants, is the need for large amounts of labeled data. One way to deal with this difficulty is to resort to the use of unsupervised learning. Data augmentation is essential to teach the network the desired invariance and robustness properties, when only few training samples are available.

In a CNN, a non-linear layer is implemented for neuron activation in conjunction with convolution. Non-linear layers use different non-linear trigger functions to signal distinct identification of likely features on each hidden layer. Non-linear layers use a variety of specific functions to implement the non-linear triggering, including the Rectified Linear Unit (ReLU), PreLU, hyperbolic tangent, absolute of hyperbolic tangent, and sigmoid and continuous trigger (non-linear) functions.

A known problem in deep learning is the covariate shift where the distribution of network activations changes across layers due to the change in network parameters during training. The changing scale and distribution of inputs at each layer implies that the network has to significantly adapt its parameters at each layer and thereby training has to be slow (i.e., use of small learning rate) for the loss to keep decreasing during training (i.e., to avoid divergence during training). A common covariate shift problem is the difference in the distribution of the training and test set which can lead to suboptimal generalization performance.

In one implementation, Batch Normalization (BN) is proposed to alleviate the internal covariate shift by incorporating a normalization step, a scale step, or a shift step. BN is a method for accelerating deep network training by making data standardization an integral part of a network architecture. BN guarantees more regular distributions at all inputs. BN can adaptively normalize data even as a mean variance change over time during training. It internally maintains an exponential moving average of the batch-wise mean and variance data. The main effect is to aid with gradient propagation similar to residual connections. The BN layer can be used after a convolutional, densely, or fully connected layer but before the outputs are fed into an activation function. For convolutional layers, the different elements of the same feature map (i.e., the activations at different locations) are normalized in the same way in order to obey the convolutional property. Thus, all activations in a mini-batch are normalized over all locations, rather than per activation.

In one implementation one or more autoencoders may be used for dimensionality reduction. Autoencoders are neural networks that are trained to reconstruct the input data, and dimensionality reduction is achieved using a fewer number of neurons in the hidden layers than in the input layer. A deep autoencoder may be obtained by stacking multiple layers of encoders with each layer trained independently (pretraining) using an unsupervised learning criterion. A classification layer can be added to the pretrained encoder and further trained with labeled data (fine-tuning).

Figure 15A:
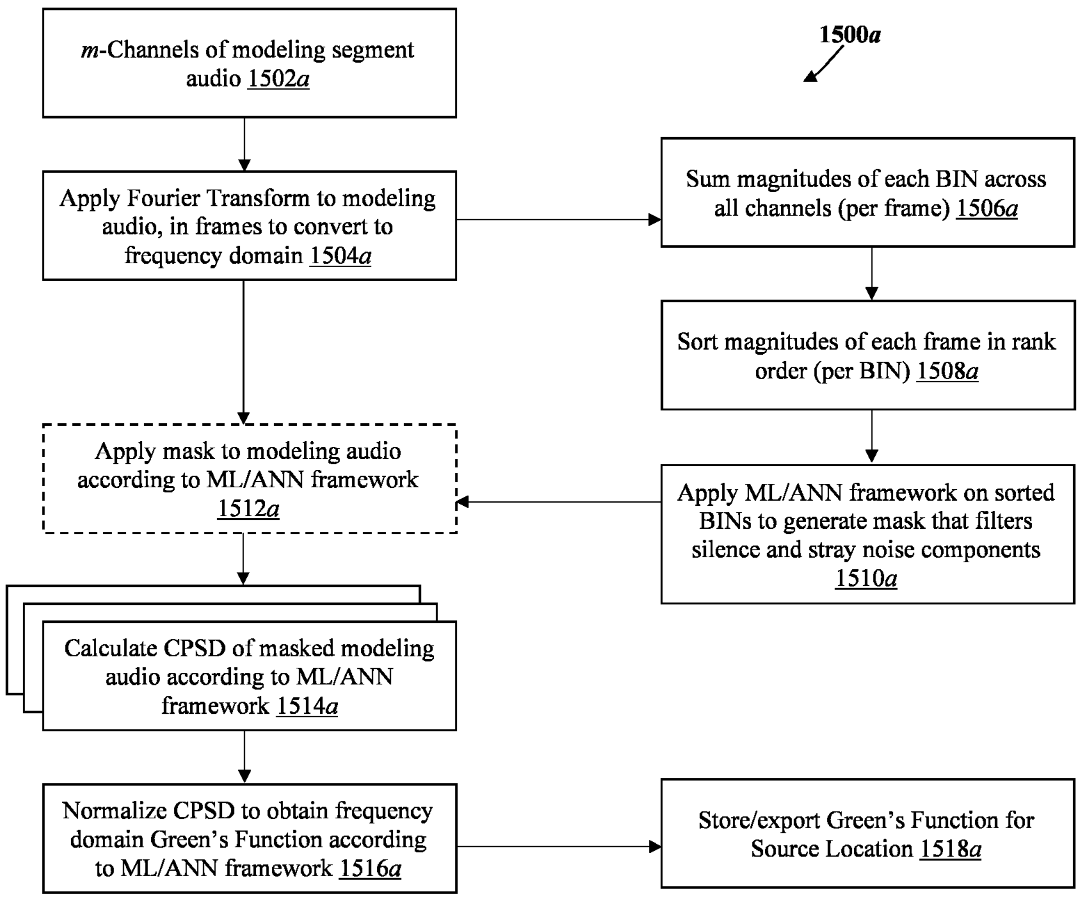
FIG. 15A is a process flow diagram of a routine for sound propagation modeling, according to an embodiment of the present disclosure.

Referring now to FIG. 15A, a process flow diagram of a routine 1500*a* for sound propagation modeling is shown. In accordance with certain aspects of the present disclosure, routine 1500*a* may be implemented or otherwise embodied as a component or subcomponent of a spatial audio processing system; for example, spatial audio processing system 100 as shown and described in FIG. 1. In certain embodiments, routine 1500*a* may be a subroutine of routine 600 and/or may comprise one or more sequential or successive steps of routine 600 (as shown and described in FIG. 6).

In accordance with an embodiment, routine 1500*a* may be initiated by receiving an audio input comprising m-Channels of modeling segment audio 1502*a*. The m-Channels are associated with one or more transducers (e.g., microphones) being located within an acoustic space or environment. The one or more transducers may be operably interfaced to comprise an array. In certain specific embodiments, a spatial audio processing system may comprise four or more audio input channels. Routine 1500*a* may continue by applying a Fourier Transform to the modeling segment audio, in frames, to convert the modeling segment audio from the time domain to the frequency domain 1504*a*. As in routine 600, the Fourier Transform in routine 1500*a* may be selected from one or more alternative transform functions, such as Fast Fourier transform, Short Time Fourier transform and/or other window functions or overlap.

Routine 1500*a* may continue by executed one or more steps 1506*a*, 1508*a*, and 1510*a*. In certain embodiments, routine 1500*a* may proceed by summing (on a per frame basis) the magnitudes of each binary file, or BIN, for each channel of audio 1506*a*. The magnitudes of each frame may be sorted in rank order, per BIN 1508*a*. Routine 1500*a* process the sorted BINs according to an MVL framework, optionally comprising a convolutional recurrent neural network (CRNN), to generate a mask configured to filter silence and stray noise components from the m-Channels of modeling segment audio 1510*a*.

In accordance with certain aspects of the present disclosure, the CRNN may start with traditional 2D convolutional neural network followed by batch normalization, ELU activation, max-pooling and dropout. Three such convolution layers may be placed in a sequential manner with their corresponding activations. The convolutional layers may be followed by the permute and the reshape layer which may contribute to the CRNN as the shape of the feature vector differs from convolutional neural network to recurrent neural network (RNN). In accordance with certain aspects of the present disclosure, the permute layers may change the direction of the axes of the feature vectors, which may be followed by the reshape layers, which may convert the feature vector to a 2-dimensional feature vector. The CRNN may comprise two bidirectional gated recurrent unit (GRU) layers with n number of GRU cells in each layer where n depends on the number of classes of the classification performed using the corresponding network. The bidirectional GRU may be used instead of unidirectional RNN layers because the bidirectional layers consider not only the future timestamps but also the future timestamp representations as well. Incorporating two-dimensional representations from both the timestamps allows incorporating the time dimensional features in an optimal manner. The output of the bidirectional layers may be fed to the time distributed dense layers followed by a fully connected layer to generate the mask. In certain embodiments, routine 1500*a* may continue by applying the mask (e.g., as calculated by the CRNN) to the modeling audio segment to obtain only time-frequency BINs containing the source signal 1512*a*. Routine 1500*a* may continue by calculating, according to the ML framework, the cross power spectral density (CPSD) of the masked modeling audio segment for each BIN, for each of the m-Channels of audio 1514*a*. Routine 1500*a* may continue by normalizing, according to the ML framework, the CPSD to obtain a frequency domain Green's Function for each BIN 1516*a* to identify an audio propagation model originating from a three-dimensional point source within the audio environment/location.

In accordance with certain aspects of the present disclosure, steps 1514*a* and 1516*a* may utilize training/modeling data corresponding to the three-dimensional point source within the audio environment/location to calculate (i.e., learn) and normalize the CPSD of the masked modeling audio segment for each BIN based on one or more Deep Neural Network (DNN), cascade-correlation neural network, or the CRNN. The cascade-correlation neural network may comprise supervised learning algorithm that begins with a minimal network, then automatically trains and adds new hidden units one by one, creating a multi-layer structure. Once a new hidden unit has been added to the network, its input-side weights are frozen. This unit then becomes a permanent feature-detector in the network, available for producing outputs or for creating other, more complex feature detectors. Certain advantages of using a cascade-correlation neural network as part of the ML framework include speed of modeling (i.e., learning), self-deterministic size and topology, retention of the structures it has built (even if the training set changes) and it requires no back-propagation of error signals through the connections of the network. In certain embodiments, the Green's Function data may be continuously updated/refined in response to changing conditions/variables, including tracking a target sound source as it moves to one or more new/different locations within the audio environment/location. Routine 1500*a* may conclude by storing/exporting the Green's Function for the point source location within the audio environment 1518*a*.

Figure 15B:
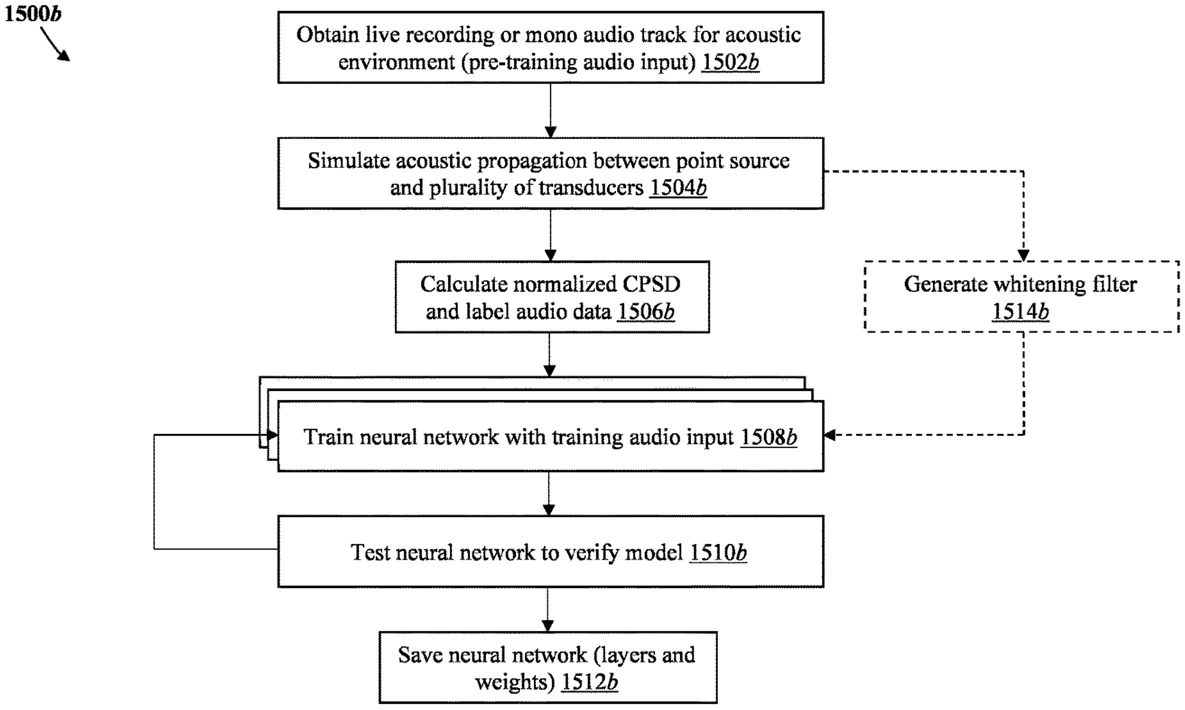
FIG. 15B is a process flow diagram of a routine for pre-training a machine learning framework for sound propagation modeling, according to an embodiment of the present disclosure.

Referring now to FIG. 15B, a process flow diagram of a routine 1500*b* for pre-training a machine learning framework for sound propagation modeling is shown. According to an embodiment of the present disclosure, routine 1500*b* comprises operations for pre-training and training a machine learning framework for implementing a normalized CPSD calculator and/or whitening filter. In accordance with certain aspects of the present disclosure, the machine learning framework comprises a neural network (e.g., an artificial neural network). In accordance with certain embodiments, routine 1500*b* may be initiated by executing one or more steps for obtaining (i.e., initializing) a live audio track recording or mono audio track for an acoustic environment 1502*b*. The live record audio track recording or mono audio track pre-training audio input for the machine learning framework. Routine 1500*b* may proceed by executing one or more steps or operations for simulating an acoustic propagation for the pre-training audio input between simulated point source in the acoustic environment and a plurality of transducers in the acoustic environment 1504*b*. Routine 1500*b* may proceed by executing one or more steps or operations for calculating a normalized cross power spectral density based on the simulated acoustic propagation and generate labels for the audio data 1506*b*. In accordance with certain aspects of the present disclosure, the labels for the audio data comprise a ground truth as a basis for comparing an output of the machine learning framework in order to test/validate the machine learning framework (i.e., neural network model). In accordance with certain aspects of the present disclosure, routine 1500*b* may further comprise one or more steps for calculated a whitening filter to filter silence and stray noise components from (i.e., non-target audio signals) based on the simulated acoustic propagation 1514*b*. Routine 1500*b* may further label the audio data based on one or more parameters of the calculated whitening filter. In accordance with certain aspects of the present disclosure, routine 1500*b* may execute one or more steps or operations to train the machine learning framework (i.e., neural network) with one or more training audio inputs 1508*b*. Routine 1500*b* may execute one more steps for testing/validate the machine learning framework (i.e., model) 1510*b*. In accordance with certain aspects of the present disclosure, step 1510*b* may comprise providing one or more training audio inputs to the machine learning framework and comparing the output(s) of the machine learning framework to the ground truth(s) to determine whether the output(s) of the machine learning framework is/are within an acceptable margin to the ground truth(s). If YES, the machine learning framework has been verified and may be saved/exported 1512*b* (including layers and weights in a neural network implementation) to be utilized for calculating a normalized cross power spectral density and/or whitening filter in a spatial audio processing method and system.

Figure 16:
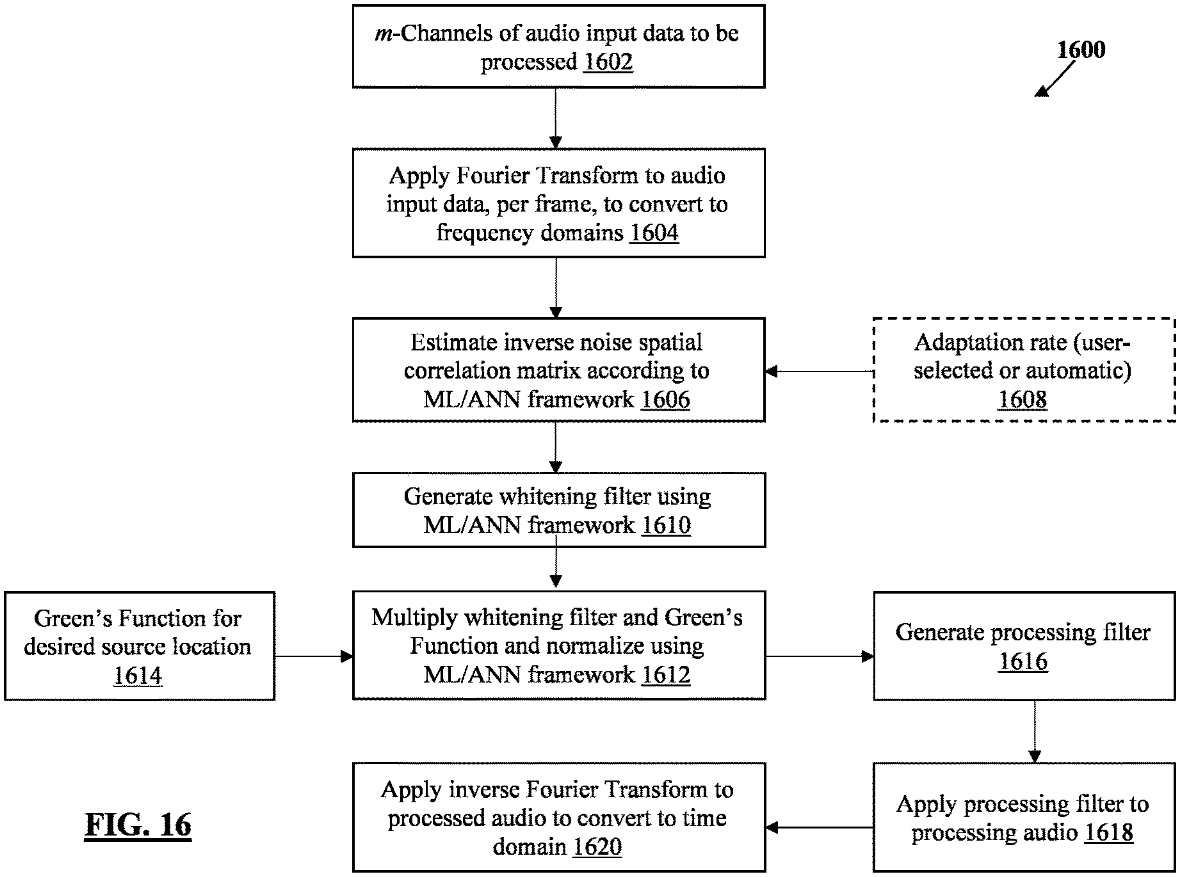
FIG. 16 is a process flow diagram of a routine for spatial audio processing, according to an embodiment of the present disclosure.

Referring now to FIG. 16, a process flow diagram of a routine 1600 for spatial audio processing is shown. In accordance with certain aspects of the present disclosure, routine 1600 may be implemented or otherwise embodied as a component or subcomponent of a spatial audio processing system; for example, spatial audio processing system 100 as shown and described in FIG. 1. In certain embodiments, routine 1600 may be a subroutine of routine 700 and/or may comprise one or more sequential or successive steps of routine 700 (as shown and described in FIG. 7).

In accordance with certain aspects of the present disclosure, routine 1600 may be initiated by receiving an audio input comprising m-Channels of audio input data to be processed 1602. The m-Channels are associated with one or more transducers (e.g., microphones) being located within an acoustic space or environment. The one or more transducers may be operably interfaced to comprise an array. In certain specific embodiments, a spatial audio processing system may comprise four or more audio input channels. In certain embodiments, an increase in the number of channels and/or lengthening the processing frame size of the audio input data may improve source separation performance. Routine 1600 may continue by applying a Fourier Transform to each frame of audio input data to convert the audio input data from the time domain to the frequency domain. As in routine 1500, the Fourier Transform in routine 1600 may be selected from one or more alternative transform functions, such as Fast Fourier transform, Short Time Fourier transform and/or other window functions or overlap. Routine 1600 may continue by estimating (i.e., learning) an inverse noise spatial correlation matrix according to an adaptation rate, per frame of audio input data using a Deep Neural Network (DNN) that is pre-trained (e.g., as described in FIG. 15, above), the cascade-correlation neural network, or the convolutional recurrent neural network (CRNN) 1606. The adaptation rate may be manually selected by the user or may be automatically selected 1608 via a selection algorithm or rules engine within routine 1600.

Routine 1600 may utilize a convolutional neural network (CNN) within the ML framework, as described herein, to generate a whitening filter to filter silence and stray noise components from (i.e., non-target audio signals) from the audio input 1610. The details and advantages of utilizing the CNN to generate and apply the whitening filter include those described above. In certain embodiments, the whitening filter enables improved SNR in the processed audio. In certain embodiments, whitening filter 1610 may be continuously updated on a frame-by-frame basis according to the ML framework. In other embodiments, whitening filter 1610 may be updated in response to a trigger condition, such as by a source activity detector indicating "false," (i.e., an indication that only noise is present to be used in the noise estimate). Routine 1600 may utilize the Green's Function data for the target source location 1614 to multiply the whitening filter and Green's Function, normalize the results using the ML framework 1612 and generate a processing filter 1616. Routine 1600 may further generate the processing filter according to the ML framework, optionally utilizing the CNN algorithm(s), to execute one or more operations of step 1616. The processing filter may then be applied to the audio input data to be processed 1618. Routine 1600 may conclude by applying an inverse Fourier Transform to the processed audio input data to convert the audio data from the frequency domain back to the time domain 1620.

Figure 17:
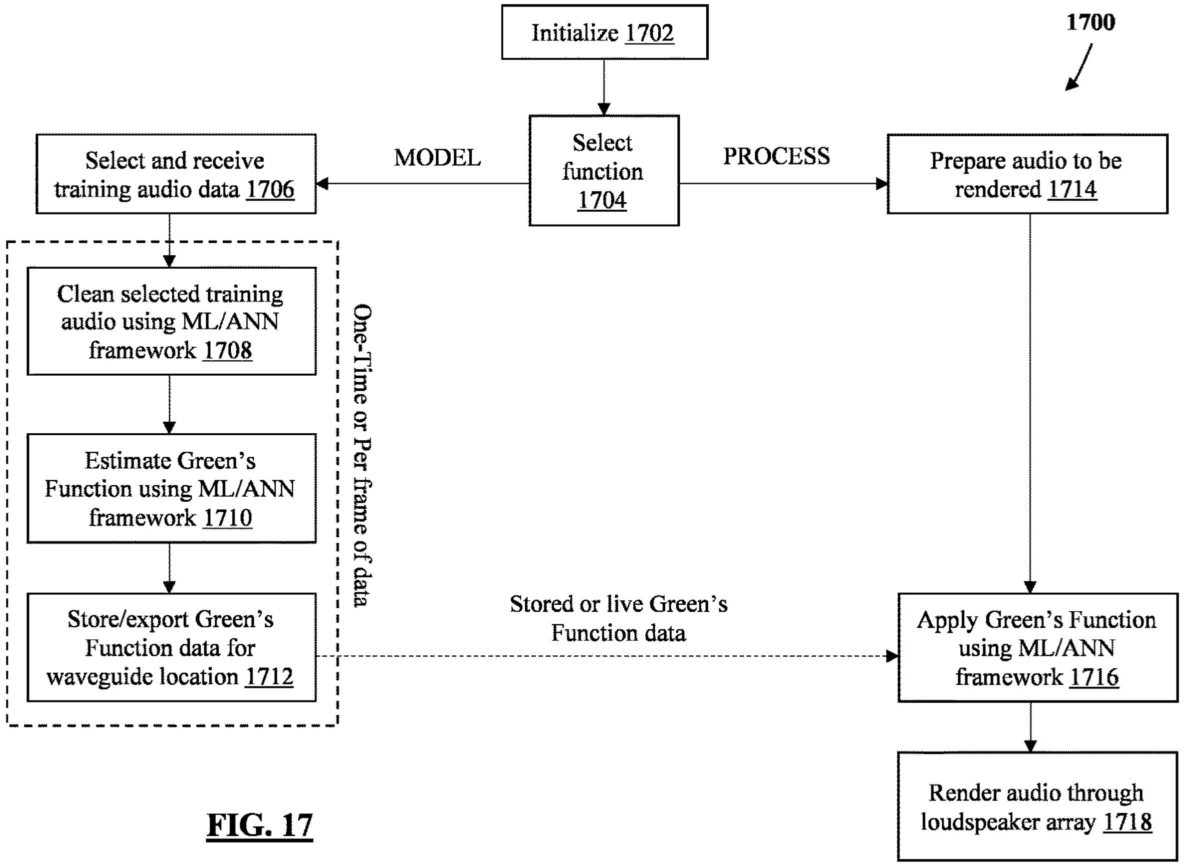
FIG. 17 is a process flow diagram of a routine for audio rendering, according to an embodiment of the present disclosure.

Referring now to FIG. 17, a process flow diagram of a routine 1700 for audio rendering is shown. In accordance with certain aspects of the present disclosure, routine 1700 may be implemented or otherwise embodied within a bi-directional spatial audio processing system; for example, spatial audio processing system 100 as shown and described in FIG. 1. In accordance with an embodiment, routine 1700 may be initialized 1702 manually or automatically in response to one or more trigger conditions. Routine 1700 may begin by selecting a modeling or processing function 1704. In accordance with a modelling function, routine 1700 may select and receive training audio data 1706. The training audio data may be cleaned (i.e., filter and weight) according to the ML framework described herein, optionally utilizing the CNN algorithm(s) as described above 1708. Routine 1700 may estimate a Green's Function for a waveguide location according to the ML framework 1710 and store/export the Green's Function data corresponding to the waveguide location 1712. In accordance with certain aspects of the present disclosure, the ML framework in step 1710 may employ one or more of the Deep Neural Network (DNN) or the cascade-correlation neural network to estimate the Green's Function for a waveguide location. In accordance with certain embodiments, steps 1708, 1710, and 1712 may be executed one-time or per frame of training audio data. In accordance with a processing function, routine 1700 may prepare an audio file to be rendered 1014. In accordance with certain embodiments, routine 1700 may apply, according to the ML framework, a Green's Function transform for the target waveguide location to the audio file 1716 and render the audio through a loudspeaker array corresponding to the waveguide location 1718. In accordance with certain aspects of the present disclosure, the ML framework in step 1716 may employ the CNN to apply the Green's Function transform for the target waveguide location to the audio file.

Certain aspects of the present disclosure may be implemented with numerous general-purpose and/or special-purpose computing devices and computing system environments or configurations. Examples of well-known computing systems, environments, and configurations that may be suitable for use with embodiments of the invention include, but are not limited to, personal computers, handheld or laptop devices, personal digital assistants, multiprocessor systems, microprocessor-based systems, set top boxes, programmable consumer electronics, networks, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written and executed in a programming language, whether using a functional, imperative, logical, or object-oriented paradigm, and may be scripted, unscripted, or compiled. Examples of such programming languages include as Java, C, C++, Octave, Python, Swift, Assembly, and the like.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other than the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While certain exemplary embodiments have been described and shown in the accompanying drawings, it is to be understood that such embodiments are merely illustrative of, and not restrictive on, the broad invention, and that this invention is not limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for spatial audio processing comprising:

receiving, with an audio processor, an audio input comprising audio signals captured by a plurality of transducers within an acoustic environment;

converting, with the audio processor, the audio input from a time domain to a frequency domain according to at least one transform function;

calculating, with the audio processor, a normalized cross power spectral density for the audio input according to a machine learning framework, wherein the machine learning framework comprises a one or more of an artificial neural network, a deep neural network, a cascade-correlation neural network or a convolutional recurrent neural network, determining, with the audio processor, at least one acoustic propagation model for at least one source location within the acoustic environment according to the machine learning framework and the normalized cross power spectral density;

processing, with the audio processor, the audio input according to the at least one acoustic propagation model to spatially filter at least one target audio signal from one or more non-target audio signals, wherein the target audio signal corresponds to the at least one source location; and applying, with the audio processor, a whitening filter to a spatially filtered target audio signal to derive at least one separated audio output signal, wherein the whitening filter is applied concurrently or concomitantly with the at least one acoustic propagation model.

2. The method of claim 1 further comprising calculating, with the audio processor, a mask for one or more non-target audio signals in the audio input according to the machine learning framework.

3. The method of claim 1 wherein processing the audio input further comprises estimating a spatial correlation matrix according to the machine learning framework.

4. The method of claim 1 further comprising generating the whitening filter according to the machine learning framework, wherein the machine learning framework comprises a convolutional neural network.

5. The method of claim 1 further comprising cleaning the audio input according to the machine learning framework, wherein the machine learning framework comprises a convolutional neural network.

6. The method of claim 5 wherein the audio input comprises a training audio input.

7. The method of claim 1 wherein determining the at least one acoustic propagation model further comprises estimating a Green's Function for the audio input according to the machine learning framework.

8. The method of claim 7 further comprising applying the estimated Green's Function to the audio input according to the machine learning framework to spatially filter the at least one target audio signal from the one or more non-target audio signals.

9. The method of claim 1 wherein the at least one transform function is selected from the group consisting of a cochlear filter-bank, an auditory filter-bank, a linear filter-bank, a non-linear filter-bank, Fourier transform, Fast Fourier transform, Short Time Fourier transform and modulated complex lapped transform.

10. The method of claim 9 further comprising performing, with the audio processor, at least one inverse transform function to convert the at least one separated audio output signal from a frequency domain to a time domain.

11. The method of claim 10 further comprising rendering or outputting, with the audio processor, a digital audio output comprising the at least one separated audio output signal.

12. A spatial audio processing system, comprising:

a plurality of acoustic transducers being located within an acoustic environment and operably engaged to comprise an array, wherein the plurality of acoustic transducers are configured to capture acoustic audio signals from sound sources within the acoustic environment;

a computing device comprising an audio processing module communicably engaged with the plurality of acoustic transducers to receive an audio input comprising the acoustic audio signals, the audio processing module comprising at least one processor and a non-transitory computer readable medium having instructions stored thereon that, when executed, cause the at least one processor to perform one or more spatial audio processing operations, the one or more spatial audio processing operations comprising:

converting the audio input from a time domain to a frequency domain according to at least one transform function;

calculating, with the audio processor, a normalized cross power spectral density for the audio input according to a machine learning framework, wherein the machine learning framework comprises a one or more of a deep neural network, a cascade-correlation neural network or a convolutional recurrent neural network, determining at least one acoustic propagation model for at least one source location within the acoustic environment according to the machine learning framework and the normalized cross power spectral density;

processing the audio input according to the at least one acoustic propagation model to spatially filter at least one target audio signal from one or more non-target audio signals, wherein the at least one target audio signal corresponds to the at least one source location; and applying a whitening filter to a spatially filtered target audio signal to derive at least one separated audio output signal, wherein the whitening filter is applied concurrently or concomitantly with the at least one acoustic propagation model.

13. The system of claim 12 wherein processing the audio input further comprises estimating a spatial correlation matrix according to the machine learning framework.

14. The system of claim 12 further comprising generating the whitening filter according to the machine learning framework, wherein the machine learning framework comprises a convolutional neural network.

15. The system of claim 12 further comprising cleaning the audio input according to the machine learning framework, wherein the machine learning framework comprises a convolutional neural network.

16. The system of claim 15 wherein the audio input comprises a training audio input.

17. The system of claim 12 wherein determining the at least one acoustic propagation model further comprises estimating a Green's Function for the audio input according to the machine learning framework.

18. The system of claim 12 further comprising applying the estimated Green's Function to the audio input according to the machine learning framework to spatially filter the at least one target audio signal from the one or more non-target audio signals.

19. The system of claim 12 wherein the at least one transform function is selected from the group consisting of Fourier transform, Fast Fourier transform, Short Time Fourier transform and modulated complex lapped transform.

20. A non-transitory computer-readable medium encoded with instructions for commanding one or more processors to execute operations of a method for spatial audio processing, the operations comprising:

receiving an audio input comprising audio signals captured by a plurality of transducers within an acoustic environment;

converting the audio input from a time domain to a frequency domain according to at least one transform function;

calculating, with the audio processor, a normalized cross power spectral density for the audio input according to a machine learning framework, wherein the machine learning framework comprises a one or more of a deep neural network, a cascade-correlation neural network or a convolutional recurrent neural network, determining at least one acoustic propagation model for at least one source location within the acoustic environment according to the machine learning framework and the normalized cross power spectral density;

processing the audio input according to the at least one acoustic propagation model to spatially filter at least one target audio signal from one or more non-target audio signals, wherein the at least one target audio signal corresponds to the at least one source location; and applying a whitening filter to a spatially filtered target audio signal to derive at least one separated audio output signal, wherein the whitening filter is applied concurrently or concomitantly with the at least one acoustic propagation model.

* * * * *